(12) United States Patent
Hill

(10) Patent No.: US 7,791,214 B2
(45) Date of Patent: Sep. 7, 2010

(54) ADAPTIVE TIDAL CURRENT POWER EXTRACTION DEVICE

(75) Inventor: Edward Anthony Hill, Oceanside, CA (US)

(73) Assignee: Adaptide, Inc., Oceanside, CA (US)

( * ) Notice: Subject to any disclaimer, the term of this patent is extended or adjusted under 35 U.S.C. 154(b) by 444 days.

(21) Appl. No.: 11/858,004

(22) Filed: Sep. 19, 2007

(65) Prior Publication Data

US 2008/0084067 A1    Apr. 10, 2008

Related U.S. Application Data

(60) Provisional application No. 60/850,966, filed on Oct. 10, 2006.

(51) Int. Cl.
*F03D 3/04* (2006.01)

(52) U.S. Cl. .............. 290/54; 290/43; 415/60

(58) Field of Classification Search ........... 290/43, 290/44, 54, 55; 415/60; 416/122
See application file for complete search history.

(56) References Cited

U.S. PATENT DOCUMENTS

| | | | |
|---|---|---|---|
| 1,835,018 A | 12/1931 | Dameus-Georges | |
| 4,270,056 A | 5/1981 | Wright | |
| 4,686,376 A | 8/1987 | Retz | |
| 4,979,871 A * | 12/1990 | Reiner | 415/4.2 |
| 6,091,161 A | 7/2000 | Dehlsen | |
| 6,320,273 B1 * | 11/2001 | Nemec | 290/55 |
| 6,538,340 B2 * | 3/2003 | Elder | 290/55 |
| 6,543,999 B1 * | 4/2003 | Polen | 416/17 |
| 6,688,842 B2 * | 2/2004 | Boatner | 415/4.2 |
| 6,731,019 B2 | 5/2004 | Burns et al. | |
| 6,784,566 B2 * | 8/2004 | Thomas | 290/55 |
| 7,126,235 B2 * | 10/2006 | Bernhoff et al. | 290/44 |
| 7,264,202 B2 * | 9/2007 | Sullivan | 244/96 |
| 7,677,862 B2 * | 3/2010 | Boatner | 415/4.2 |
| 2003/0226767 A1 | 12/2003 | Dmasa | |

FOREIGN PATENT DOCUMENTS

WO    WO 96/07824    3/1996

* cited by examiner

*Primary Examiner*—Nicholas Ponomarenko
(74) *Attorney, Agent, or Firm*—Fred C. Hernandez; Mintz Levin Cohn Ferris Glovsky, and Popeo, P.C.

(57) ABSTRACT

A system is adapted to extract energy from flowing liquid. The system includes at least one vertically-extending vane adapted to move in response to the flowing liquid. The vane has a vertical length wherein at least a portion of the vane can be positioned below a surface of a body of liquid such that the vane forms a swept area defined at least partially by the vertical portion of vertical lengths of the vane positioned below the surface. The system further includes a mechanism adapted to selectively vary the swept area.

26 Claims, 23 Drawing Sheets

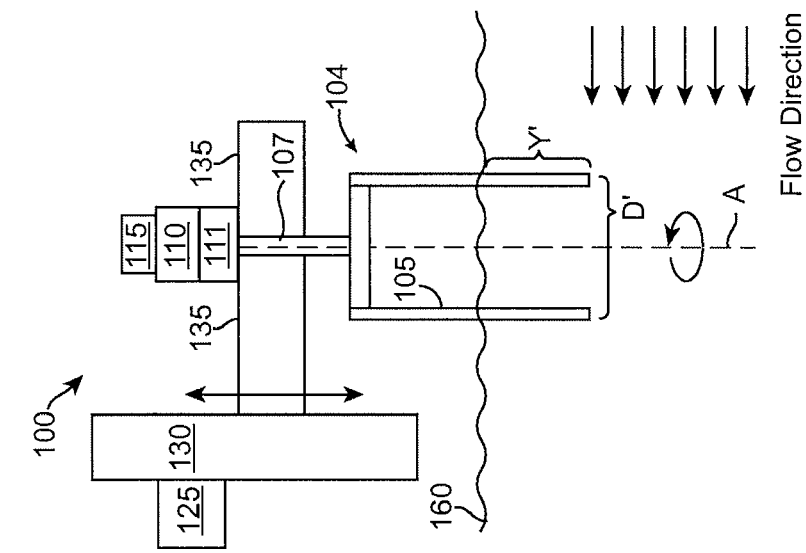
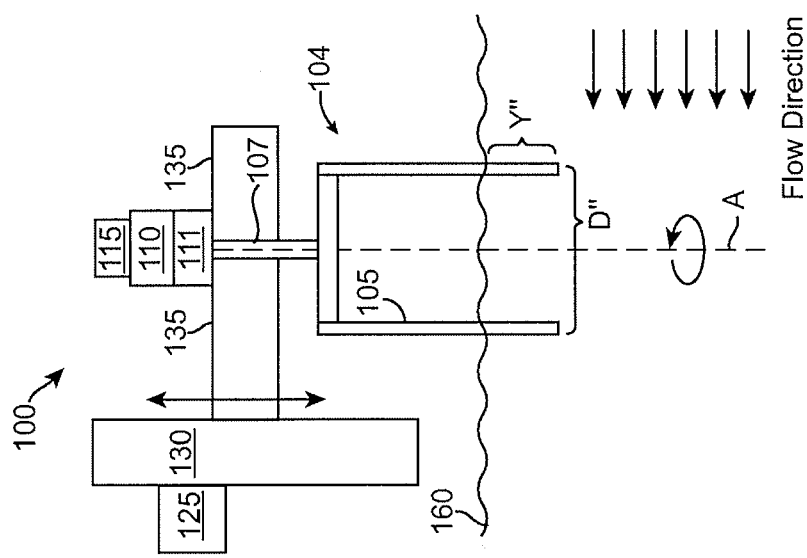
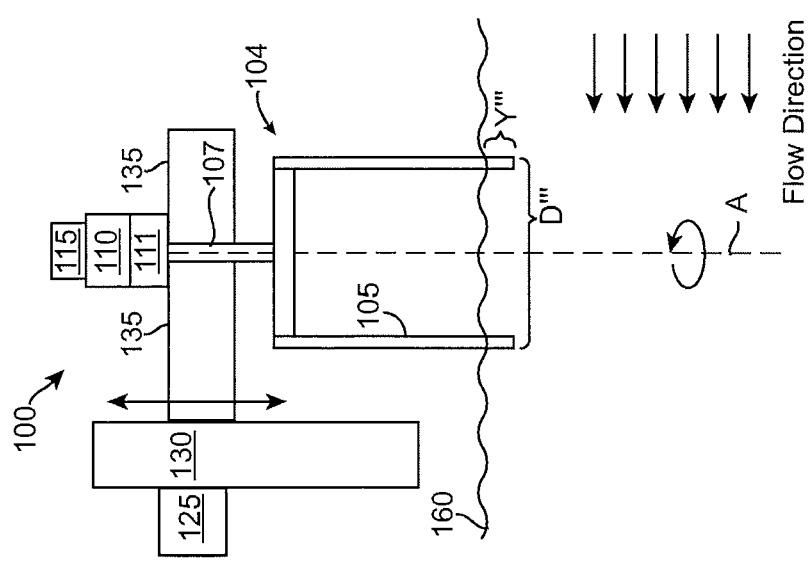
FIG. 12C
FIG. 12B
FIG. 12A

ADAPTIVE TIDAL CURRENT POWER EXTRACTION DEVICE

REFERENCE TO PRIORITY DOCUMENT

This application claims priority of co-pending U.S. Provisional Patent Application Ser. No. 60/850,966 filed Oct. 10, 2006. Priority of the aforementioned filing date is hereby claimed and the disclosure of the Provisional Patent Application is hereby incorporated by reference in its entirety.

BACKGROUND

Extracting power from water has primarily come in the form of utilizing the potential energy of dammed water to drive a generator. A less common and greatly underutilized method of extracting power from water makes use of the kinetic energy contained in tidal and river flows. Harnessing power from the flow of water can provide an urgently needed, clean, renewable, and even inexhaustible energy source.

Various approaches have been taken to harness tidal energy. One approach has been to build large estuarine tidal barrages or tidal fences. At high tide, the water is either blocked behind a fence or shut into a sequence of locks and gates. Then, as the tide recedes, the trapped water is forced to escape through turbines to produce electric power. Tide barrages and tidal fences are large-scale, high-cost projects that must be custom designed for each particular site. They inhibit fish migration, induce silt build-up, cause localized flooding, and have an adverse environmental impact in general.

Another approach has been to use tidal turbines, which are analogous to wind turbines. Wind turbine manufacturers typically specify a cut-in speed, cut-out speed, and survival speed for their machines. The cut-in speed is the minimum fluid speed required for power production, the cut-out speed is the maximum fluid speed at which power can be produced, and the survival speed is the maximum fluid speed that the wind turbine can withstand without sustaining damage. Analogous to wind turbines, tidal turbines also have a cut-in speed, cut-out speed, and survival speed.

At sites with high average kinetic tidal power content (tidal power content), the maximum and minimum tidal current speed (tidal speed) may differ greatly. For example, at a certain site, the tidal speed may vary between 1 m/s and 8 m/s, with the average tidal speed around 4 m/s.

Conventional turbines must be designed to withstand the forces generated by the site's maximum tidal speed; in other words, a conventional turbine's survival speed must be larger than the maximum tidal speed at the site where it is deployed. Therefore it is not cost effective to build a conventional turbine at sites with large tidal speed variation. The conventional turbine and associated support structure must be sized for the maximum tidal speed, however power will only be produced near the average tidal speed and between the cut-in and cut-out speeds which are much slower and occur most frequently. Installation of a conventional tidal turbine at a site with large tidal speed variation requires an over-built and consequently expensive structure which can withstand the maximum tidal speed, and therefore this approach will not enable optimal return on investment.

In another approach, conventional tidal turbines have been placed at sites that have relatively narrow ranges of tidal speed variation. This approach requires extensive site characterization, and conventional turbines are typically custom-designed for such sites once flow properties are quantified. Even so, conventional turbines must still be built robust enough to withstand the drag associated with the peak tidal speed at such sites.

Both of these approaches result in an expensive project cycle which is likely to require site characterization, site-specific system development, and on-site construction; they preclude the economies of scale afforded by standardization and high-volume manufacturing. Because of the highly variable tidal speeds associated with high tidal power content sites, the kinetic tidal energy at such sites remains unharnessed. An inexpensive, unconventional tidal turbine which can regulate mechanical power output reliably between its cut-in and cut-out speeds, survive extremely high tidal speeds, eliminate the need for extensive site characterization, and be deployed at multiple high tidal power content sites is required.

SUMMARY

The adaptive capacity of the devices and methods described herein enables a single tidal turbine design to be deployed effectively at a multitude of similar high tidal power content sites. The disclosed system provides minimal requirements regarding site characterization, custom design, or specialized construction methods. Additionally, the disclosed approach enables the complete removal of the power extraction device from the water flow when infrequent maximum tidal speeds occur. This reduces the cost of the associated mounting structure. The disclosed devices and methods are adapted to regulate a predetermined output of the turbine, such as mechanical power output.

In one aspect, there is disclosed a system for generating power from flowing liquid, comprising two or more vertically-extending vanes adapted to move in response to the flowing liquid, each of the vanes having a vertical length, wherein at least a portion of the vanes can be positioned below a surface of a body of liquid such that the vanes form a swept area defined at least partially by the vertical portion of vertical lengths of the vanes positioned below the surface; and a mechanism adapted to selectively vary the swept area.

In another aspect, there is disclosed a method of extracting power from a body of liquid, comprising: providing a turbine having at least two substantially vertical vanes that can move in response to flow of the liquid, each of the vanes having a vertical height; submerging at least a portion of the vanes below a surface of the liquid to cause the vanes to move in response to flow of the liquid; and moving the vanes along an at least partially vertical axis to vary a swept area of the vanes with respect to the liquid so as to regulate a predefined output of the turbine.

In another aspect, there is disclosed a turbine system for generating electric power from flowing water comprising: a vertical axis rotor wherein the rotor further comprises a shaft and a plurality of blades; a gear assembly connected to the shaft; a generator connected to the gear assembly; a depth actuator for raising and lowering the rotor; and a programmable controller wherein controller is programmed with at least one protocol for controlling the depth actuator.

Other features and advantages should be apparent from the following description of various embodiments, which illustrate, by way of example, the principles of the invention.

BRIEF DESCRIPTION OF THE DRAWINGS

FIGS. 12A-12C show another embodiment of the turbine system.

DETAILED DESCRIPTION

The adaptive capacity of the devices and methods described herein enables a single tidal turbine design to be deployed effectively at a multitude of similar high tidal power content sites. The disclosed system provides minimal requirements regarding site characterization, custom design, or specialized construction methods; and therefore low-cost manufacturing methods may be employed to harvest tidal energy worldwide. Additionally, the disclosed approach enables the complete removal of the power extraction device from the water flow when infrequent maximum tidal speeds occur; this reduces the cost of the associated mounting structure. Again, the disclosed devices and methods enable a single tidal power extraction device to achieve competitive power production cost at a multitude of high tidal power content sites. The disclosed devices and methods are adapted to regulate a predetermined output of the turbine, such as mechanical power output.

It is desirable to have a standardized (or "off-the-shelf") low-cost system for extracting energy from flowing liquid, such as water, that can withstand extreme flow velocities, and that operates economically at a multitude of sites. It is also desirable to have a system for extracting energy from flowing water that is adaptive to variations in flow speed and that outputs constant or substantially constant mechanical power in the presence of variations in flow speed. In view of the foregoing, there is a need for an improved water energy extraction system.

Before discussing the embodiments in detail, it may be helpful to first briefly review the basic concepts used in extracting energy from water using turbines, in particular vertical-axis turbines.

Figure 1:
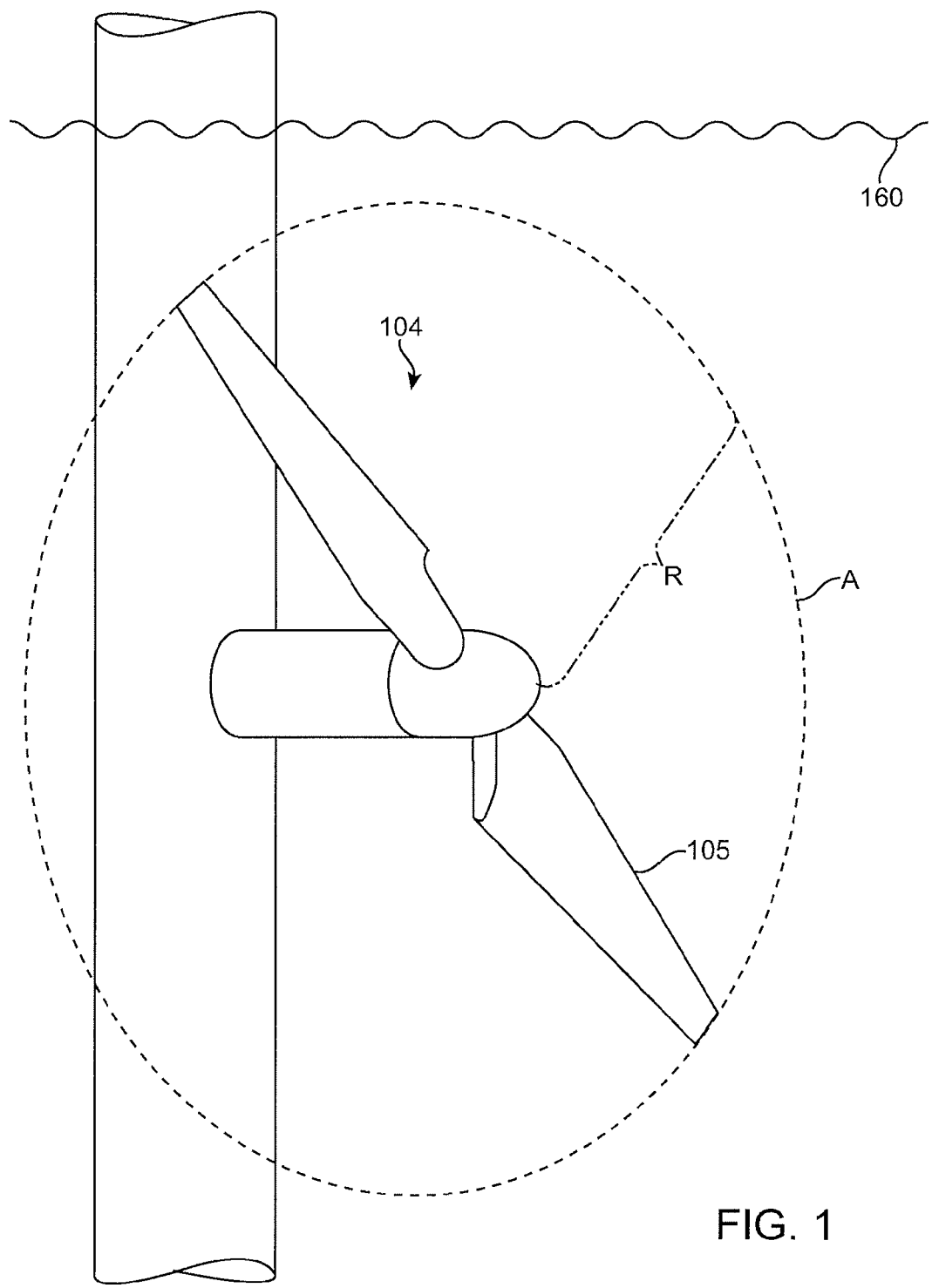
FIG. 1 shows a schematic view of a conventional horizontal axis turbine.

The mechanical power output (power output) of a turbine is a function of the swept area of the rotor. The swept area is the cross-sectional area swept by the blades perpendicular to the flowing water. FIG. 1 shows a schematic view of a conventional horizontal axis turbine. As seen in FIG. 1, the power output of a conventional horizontal-axis turbine is a function of the circle A with a radius R from the center of the rotor 104 to the end of a vane or blade 105. For a circle, area=$\pi R^2$. If the radius R of rotor is increased, the swept area of the rotor increases, and there is an increase in the power captured in a given water flow. For example, if the radius of the rotor 104 in FIG. 1 is doubled, the swept area increases four-fold and thus a four-fold increase in the gross power captured in a given water flow.

Figure 2:
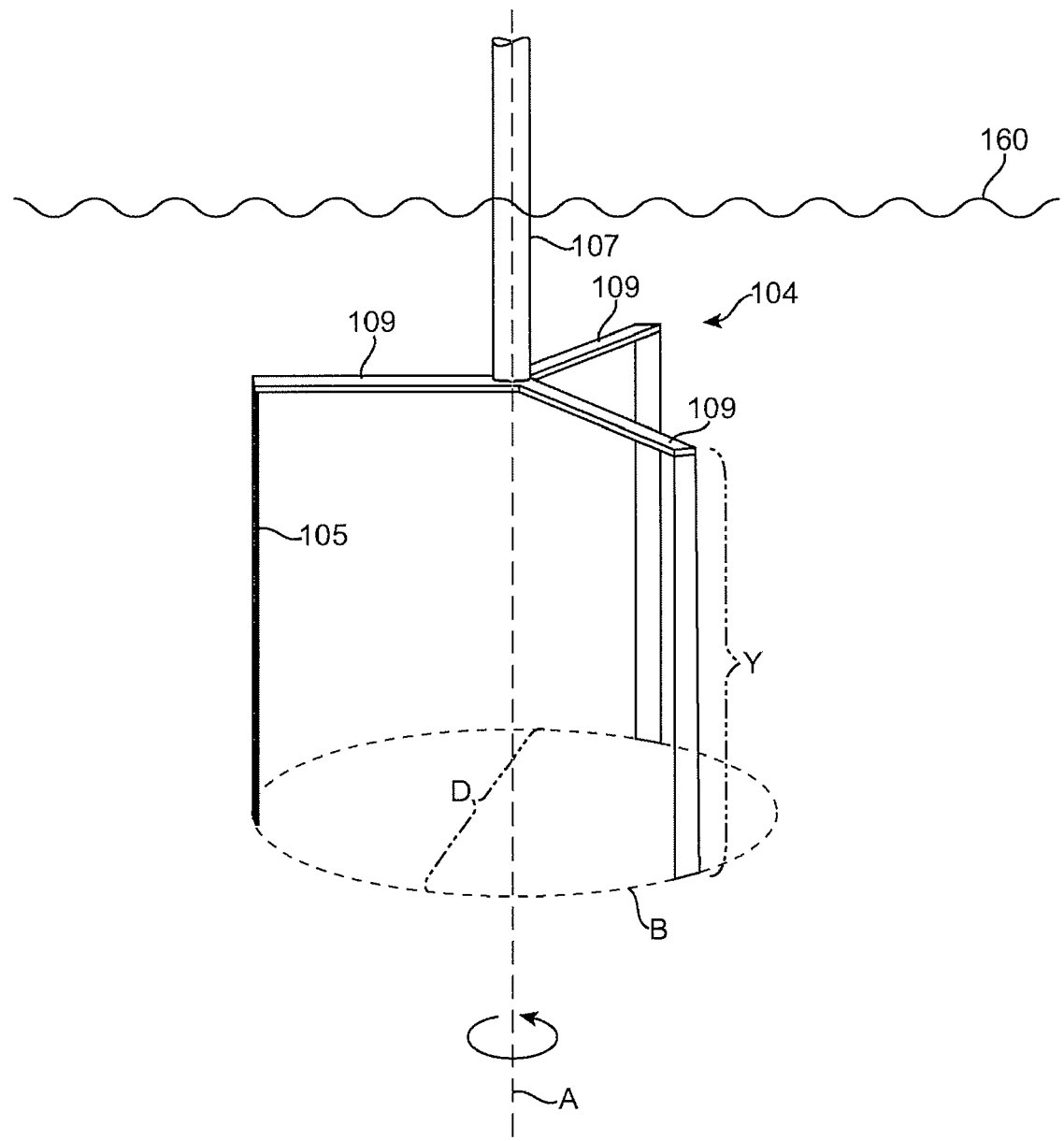
FIG. 2 shows a rotor of a vertical axis turbine.

The power output of a vertical axis turbine is also defined by the swept area. FIG. 2 depicts a rotor 104 of a vertical axis turbine that has a shaft 107 and three blades 105. The blades 105 are adapted to rotate about the shaft 107 about a diameter D, which can be fixed or can vary moving along the vertical length of the blades. Each of the blades has a vertical length or height as defined by the distance between an upper edge and a lower edge of the vane. In the illustrated embodiment, each blade 105 is mounted on a cross-member 109 that positions the blades in an offset relationship with respect to the shaft 107. It should be appreciated that the manner of rotating the blades can vary. For a vertical axis turbine with blades that are completely submersed in the water, the swept area, as seen in FIG. 2, equals the diameter D of the swept circle B multiplied by the length Y of the immersed blade. It should be noted that a vertical axis turbine may have multiple blades 105.

For a fixed swept area positioned fixedly in a flow and within a limited flow velocity range near an optimum operating point, given an arbitrary flow velocity, the rotor 104 spins at a dependent shaft speed $\omega$ for any independently chosen shaft torque T. Alternatively, the shaft speed $\omega$ may be chosen as the independent variable and a dependent shaft torque T will result. The power output is a function of both shaft speed $\omega$ and shaft torque T:

$$\text{Power Output} = T\omega.$$

When the flow velocity changes, the shaft torque and shaft speed will also change accordingly. For a fixed swept area positioned fixedly in a flow and within a limited flow velocity range near an optimum operating point, higher flow velocity will enable higher shaft torque T at equal or higher shaft speed $\omega$, and thus result in higher power output. This higher power output will also increase the overall drag force acting on the turbine (drag).

According to various embodiments disclosed herein, the power output and drag are regulated by varying the swept area of a tidal turbine. The swept area can be varied in various manners, such as by raising or lowering the vanes of the turbine to vary the length of the vanes within the water. In another embodiment, the diameter D of the vanes can be varied by moving the vanes radially or by positioning the vanes at different angles with respect to the vertical. The turbine can also employ variable pitch vanes wherein one or more of the vanes is configured to rotate about its long axis.

Figure 3A:
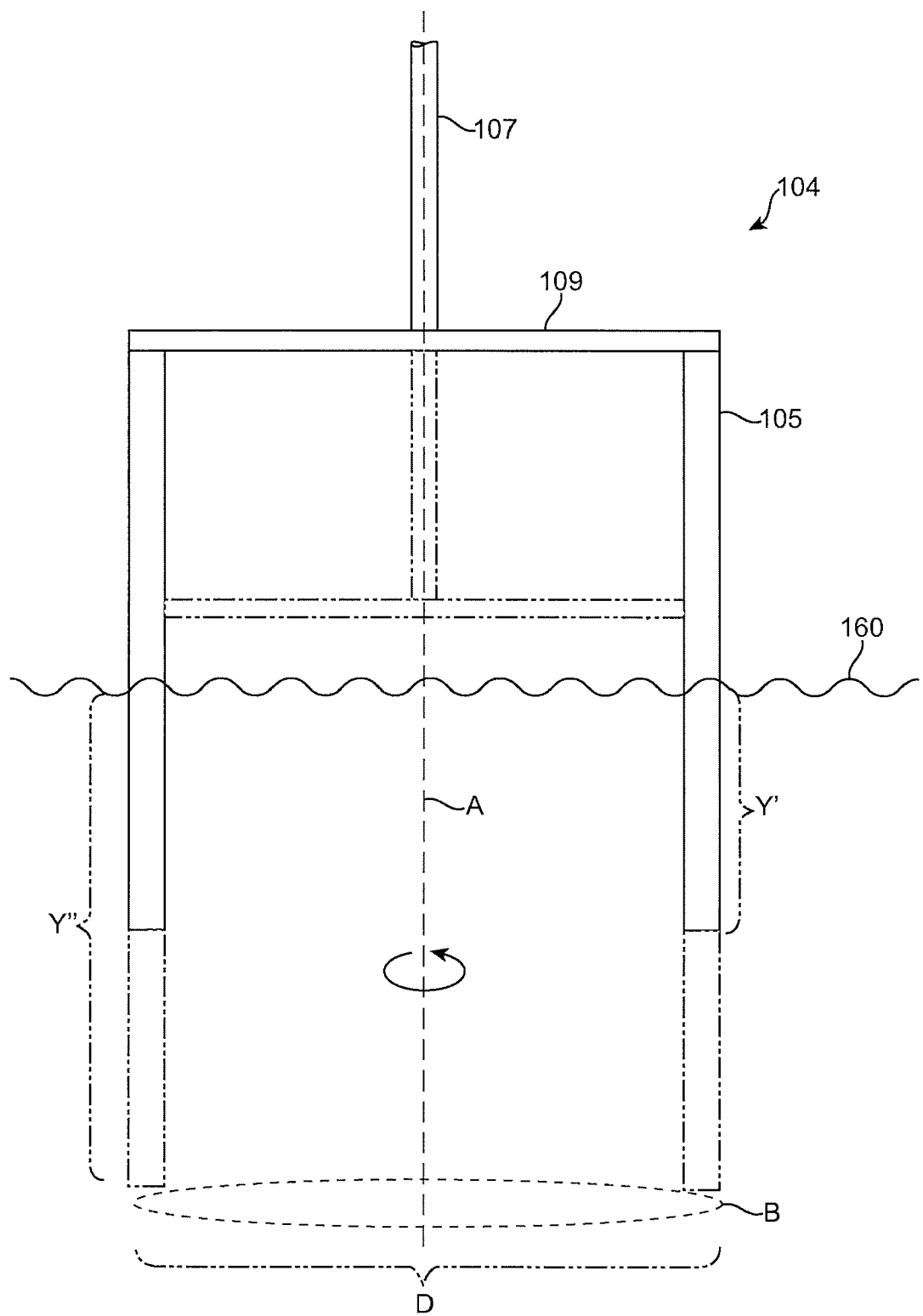
FIGS. 3A and 3B schematically depict a vertical axis turbine.
Figure 3B:
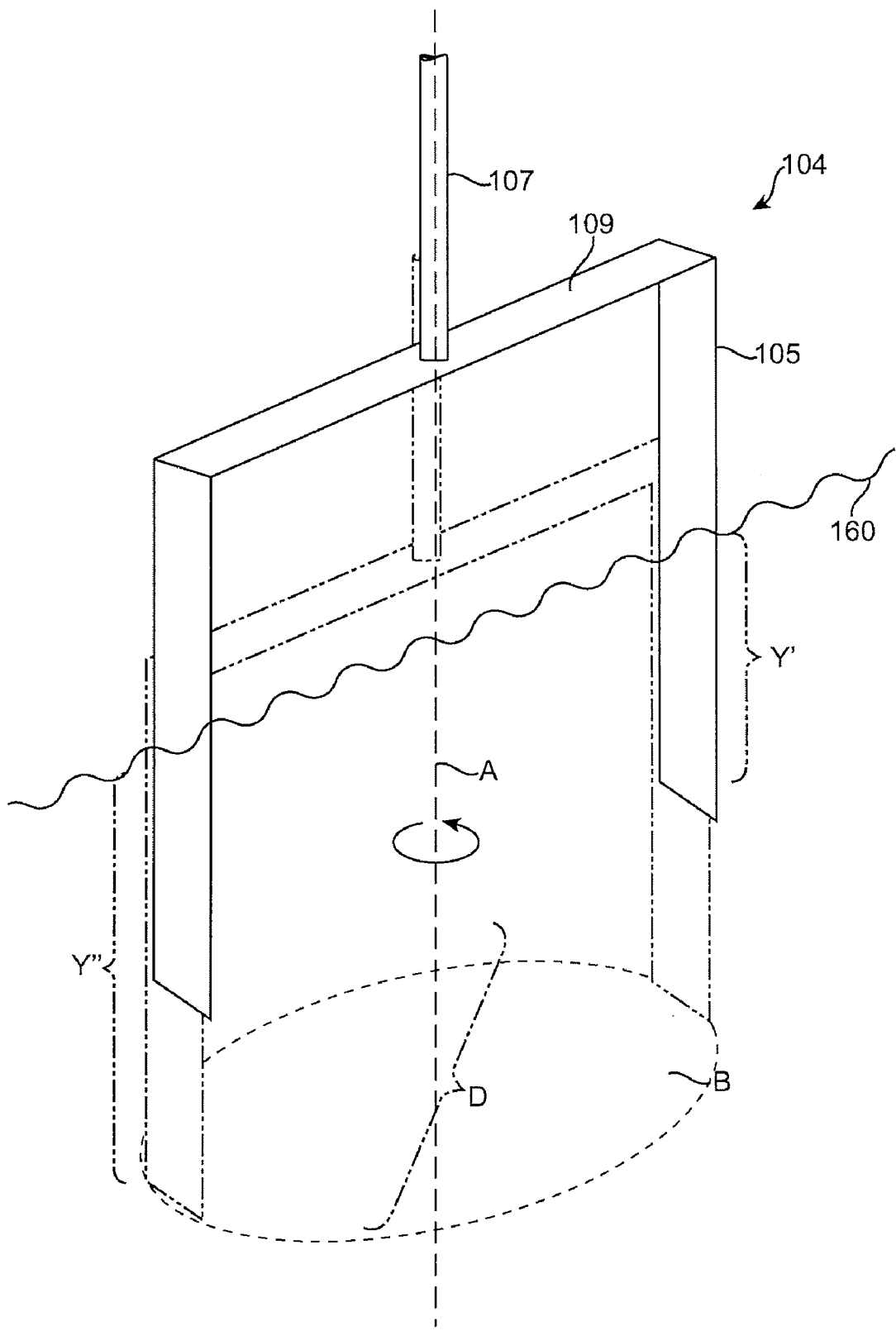
Figure 3C:
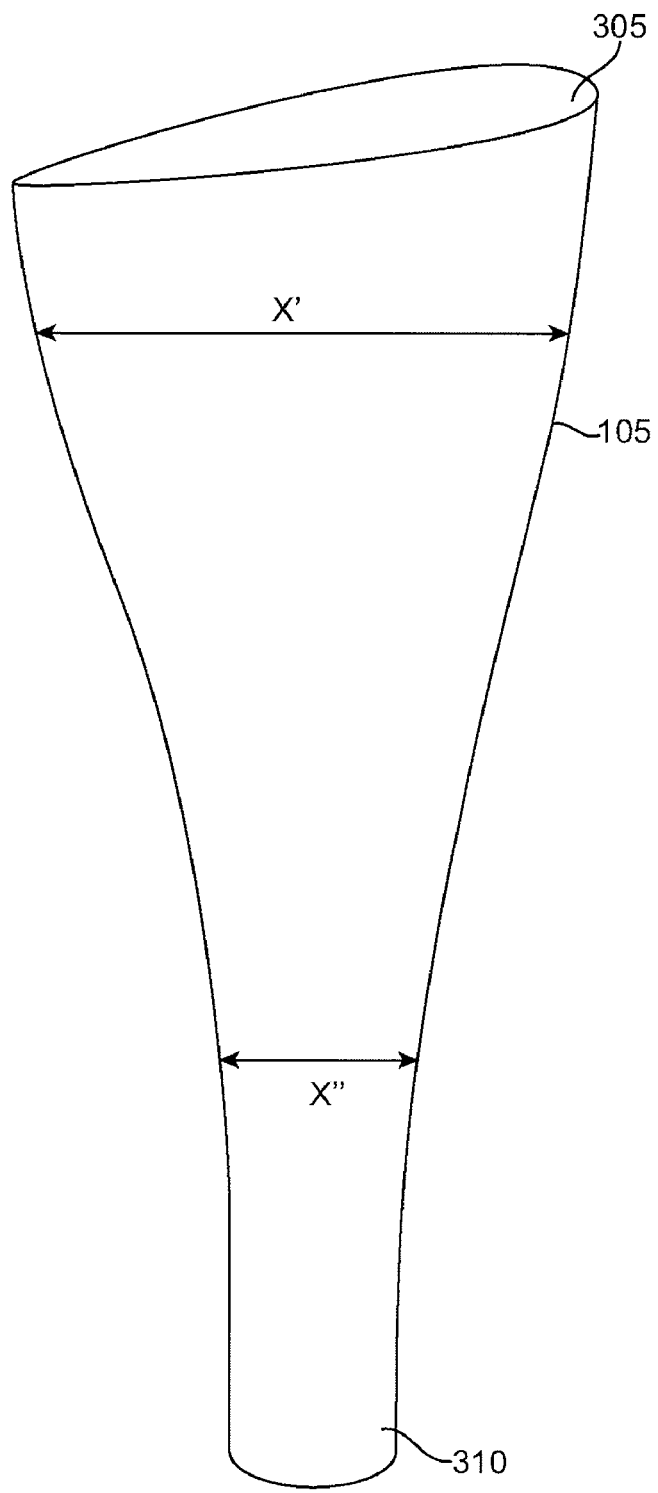
FIG. 3C shows an exemplary blade that has a varying cross-sectional shape.
Figure 3D:
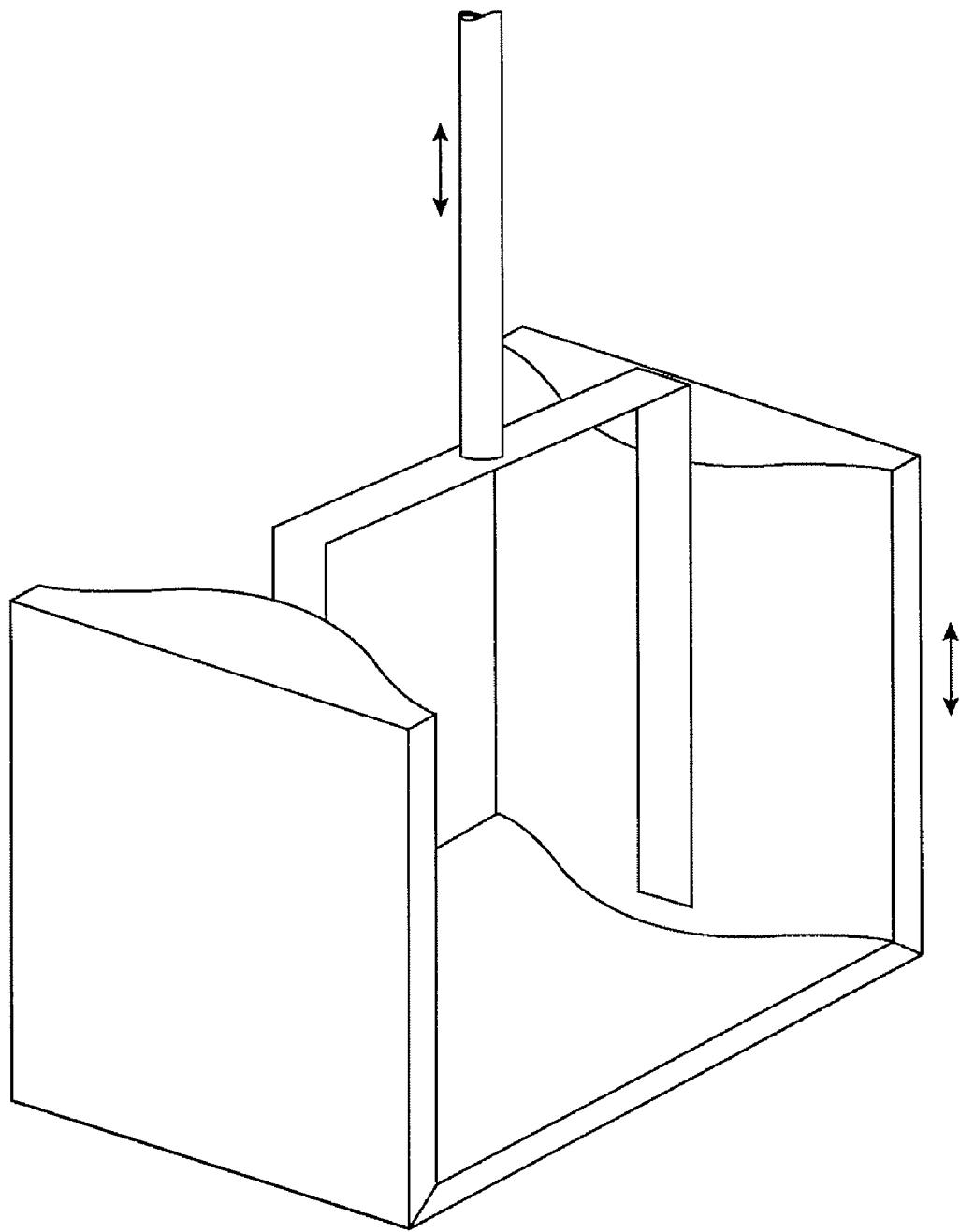
FIG. 3D shows an embodiment of a turbine that includes a movable shroud.
Figure 3E:
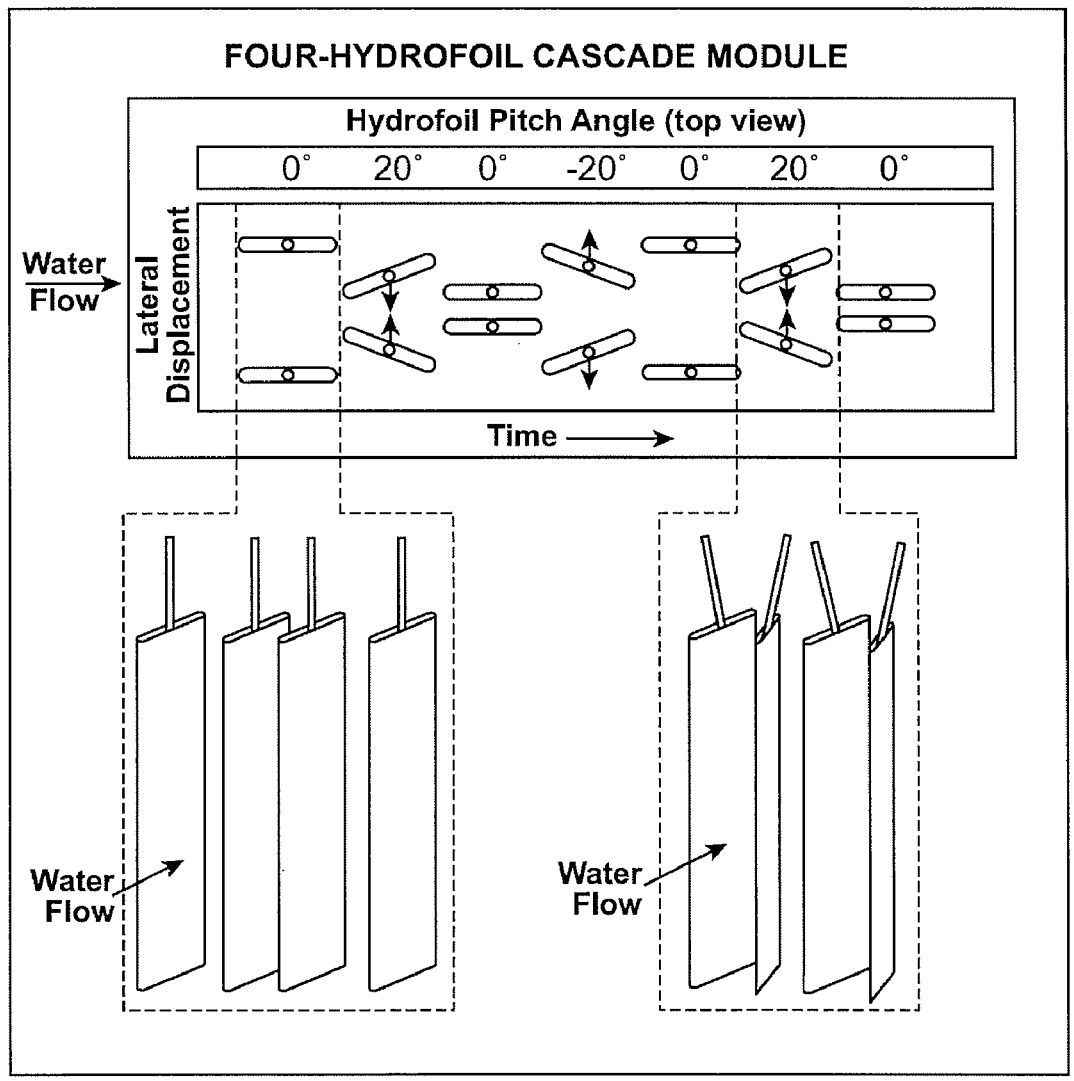
FIG. 3E shows an example of a flutter vane.

FIGS. 3A and 3B schematically depict a vertical axis rotor 104 with two vanes or blades 105. It should be appreciated that FIGS. 3A and 3B are merely schematic and that the actual structure of the rotor can vary. The system is adapted to vary the swept area by varying the depth of immersion of the blades below the surface of the water. In this regard, the blades are moved along a linear or curvilinear, vertical axis or along an axis that has a vertical component. The configuration of the blades 105 can vary. Alternately, a device, such as a shroud, can be positioned around the turbine, as shown in FIG. 3D. The shroud may move in conjunction with the turbine along an axis with a vertical component. Alternatively, the shroud may move independently of the turbine along an axis with a vertical component. The blades 105 can have any of a variety of cross-sectional shapes, such as airfoil shapes that generate lift when placed in fluid flow. In an embodiment, the blades are substantially constant in cross-sectional shape moving along the vertical length of the blade. Moreover, it should be appreciated that any of the embodiments of turbines described herein can vary in structure. For example, the turbine may consist of a flutter vane type device. A flutter vane is a device which also uses vertical vanes, however the vanes do not travel in a circular path. Instead, the vanes are connected to a linkage which enables them to generate power while moving in a reciprocal manner as shown in FIG. 3F.

In another embodiment, the cross-sectional shape of a blade varies moving along the vertical length of the blade. FIG. 3C shows an exemplary blade 105 that has a varying cross-sectional shape moving from an upper edge 305 to a lower edge 310 of the blade 105. In the illustrated embodiment, the chord dimension X varies from a larger value X' at the upper edge 305 to a smaller value X" at the lower edge 310 of the blade. Thus, the blade 105 gradually tapers in size moving from the upper edge to the lower edge. The particular shape of the blade can vary and is not limited to the embodiment shown in FIG. 3C. In one embodiment, the cross-sectional shape of the blade is a variable-shape foil that varies based on the type of fluid flow that the blade may encounter at given submersion depths. For example, a lower region of the blade can have a foil shape that is tuned for certain performance, such as an optimum performance, during high fluid flow velocity. This may be useful when only the lower tip of the blade is submersed in the water such as during high flow speed operation or during high speed startup.

As mentioned, the swept area of the system can be varied. One method of varying the swept area is to vary the depth of immersion Y of the blades 105 below the surface of the water 160. In this regard, the blades 105 are configured such that they can be moved along a vertical axis (or along an axis with a vertical component.) The manner in which the blades are moved can vary. As the blades 105 are lowered into the water, the depth of the immersion Y increases from Y' to Y". The swept area also increases from Y'×D to Y"×D. Within a limited flow velocity range near an optimum operating point, the depth of immersion Y is varied in order to control the amount of drag on the system and to control a predefined output. The predefined output is often described herein in the context of power, although it can vary. For example, the predefined output may be shaft torque T. The system is capable of lifting the blades such that they are above the water surface and completely removed from the water. Various mechanical and/or electronic means can be used to achieve the vertical movement of the vanes.

Figure 4A:
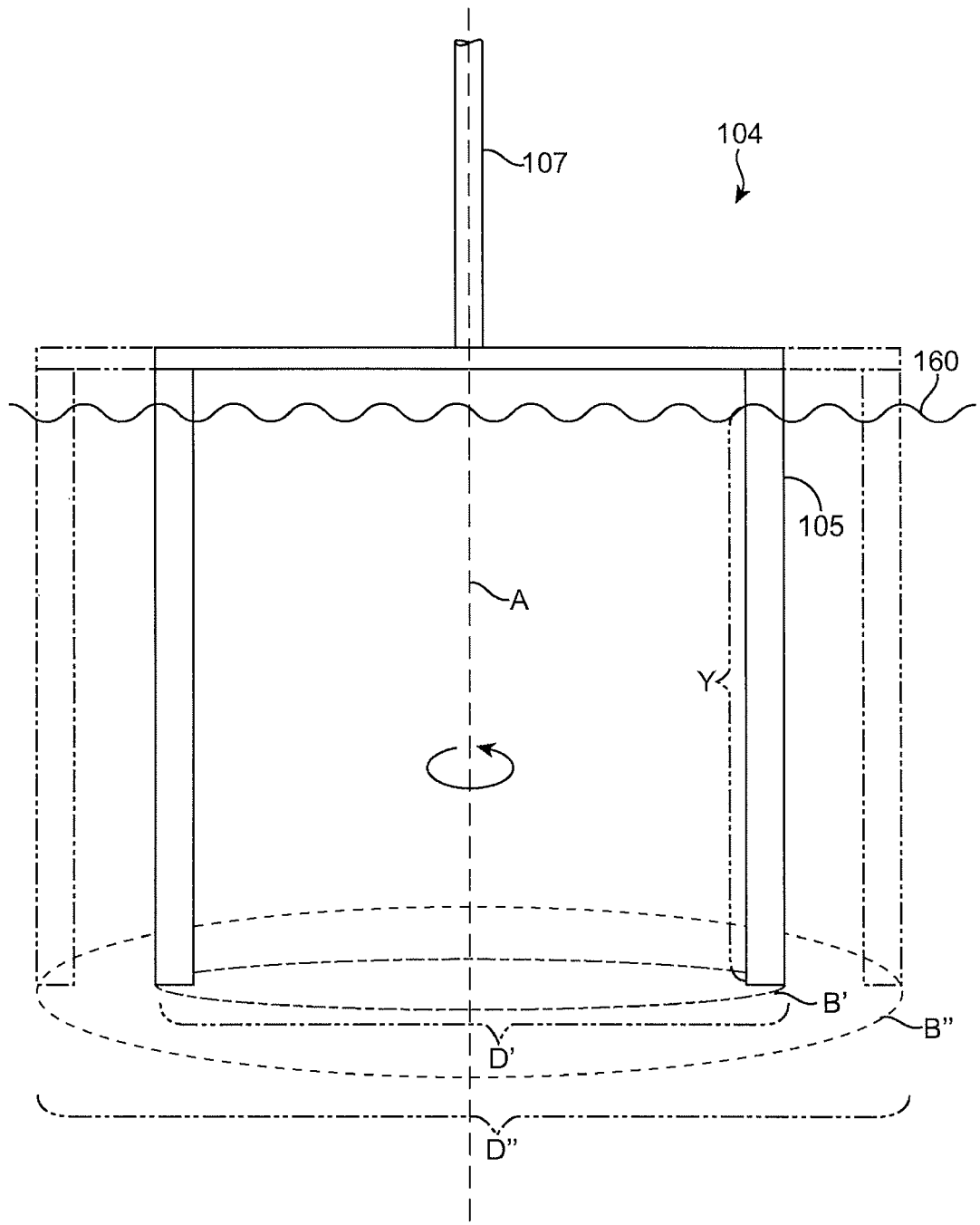
FIG. 4A shows an embodiment of a turbine that permits variance of the swept diameter.

In another embodiment, the system is adapted such that the diameter D can be varied. Various structures and/or mechanisms can be used to vary the diameter D. In one embodiment, the blades 105 are movable toward and away from the shaft 107 such that the diameter D increases or decreases as such movement occurs. FIG. 4A shows an embodiment of a turbine that permits the swept diameter to be varied. As the blades move from a first position (represented by solid lines in FIG. 4A) to a second position (represented by phantom lines in FIG. 4A), the diameter D increases from D' to D". Thus, the swept circle B increases from B' to B". The swept area also increases from D'×Y to D"×Y. Within a limited flow velocity range near an optimum operating point, the diameter D is varied, such as in order to control the amount of drag on the system and to control a predefined output.

Figure 4B:
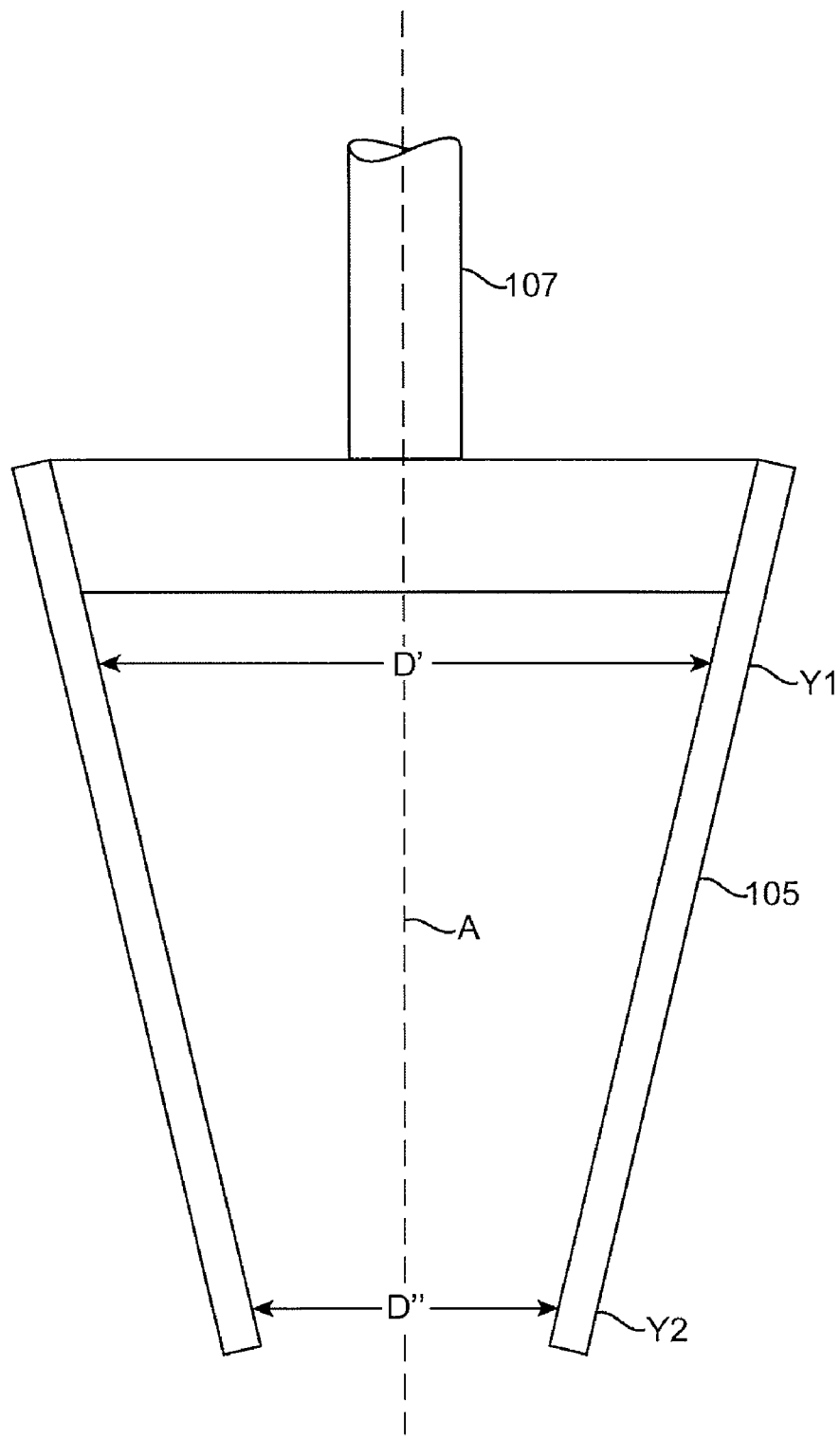
FIG. 4B shows an embodiment of a static turbine structure that has varying blade radius.

In another embodiment, a variable diameter is at least partially achieved through the fixed-position arrangement of the blades. For example, the blades 105 can be positioned at a predetermined angle with respect to a vertical axis. FIG. 4B shows an embodiment wherein the blades 105 are positioned so as to angle inward toward the vertical axis of rotation A. Such a configuration permits the swept diameter D to vary moving along the vertical length of the blades. For example, at vertical location Y1 the diameter is D' while at vertical location Y2, the diameter is D", which is less than D'. The swept diameter can be varied by moving the blades upward and downward with respect to the water surface.

In yet another embodiment, the system is adapted to selectively vary both the diameter D and the depth of immersion Y. Thus, another method of varying the swept area is to vary both the diameter D and the depth of immersion Y. Within a limited flow velocity range near an optimum operating point, the diameter D and the depth of immersion Y can both be changed or can be changed individually in order to control the amount of drag on the system and to control a predefined output. Within a limited flow velocity range near an optimum operating point, the power output may be controlled by varying only immersion depth or only radius/diameter of the rotor. The average shaft torque and average shaft speed may be controlled independently and simultaneously by varying depth and radius within a limited flow speed range around an optimum operating point.

Figure 5A:
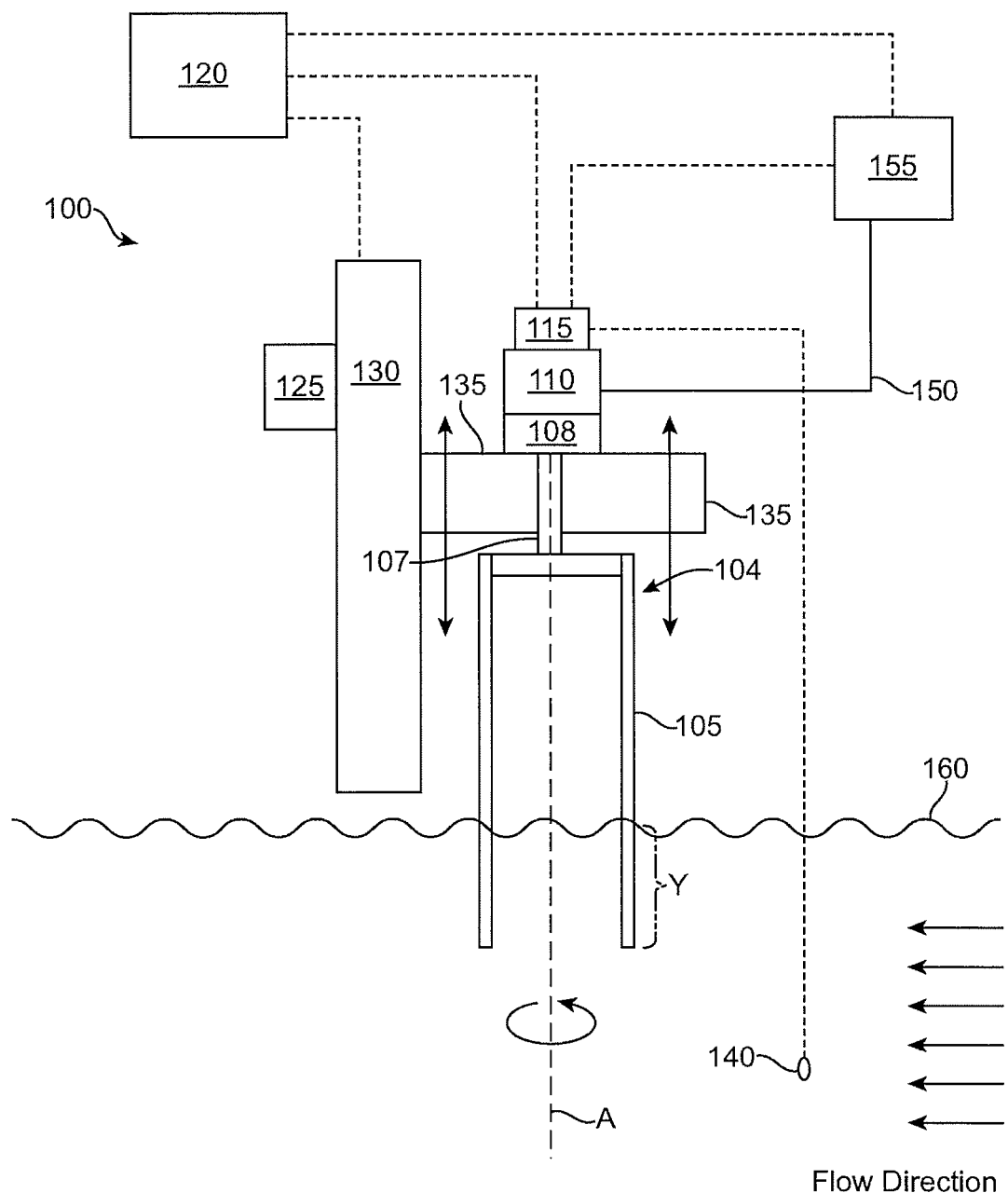
FIGS. 5A and 5B illustrate a schematic of a turbine system.
Figure 5B:
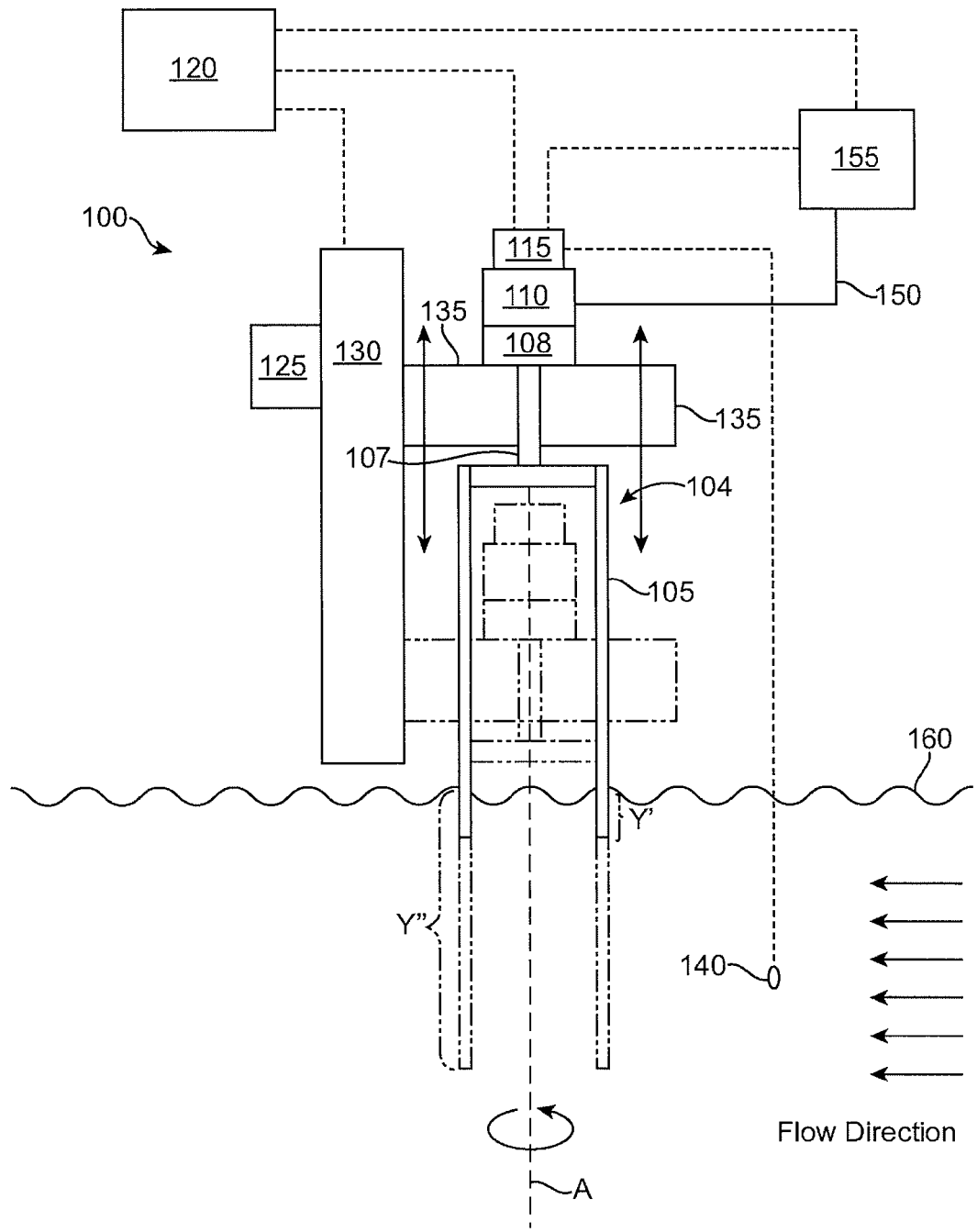

FIGS. 5a and 5b illustrate a schematic of a turbine system. It should be appreciated that the turbine system is not limited to the components shown in FIGS. 5A and 5B. Moreover, multiple components can be combined into a single component or a single component can be split into multiple components. The components can be implemented using various mechanical, electronic, or electro-mechanical means. The turbine system 100 includes a vertical axis rotor 104. The rotor 104 further includes blades 105 and a shaft 107. The blades rotate about the axis A. The rotation can be solely driven by water flow interaction with the blades, or the blades can be powered such that the rotation occurs (at least initially) via a power source other than water flow. Water flow with a flow velocity v turns the blades 105 about axis A thus turning the shaft 107 with a shaft speed ω. The shaft 107 then turns a drive assembly, such as a gear assembly 108, which drives a generator 110. The generator 110 produces electrical power. The power signal generated by the generator 110 is directed through a power output cable 150 to a power unit 155 which adapts the power signal for use by an end-user or for injection to a utility power grid. It should be appreciated that any type of system or protocol can be used to convert mechanical power to electrical power.

In an embodiment, the system 100 is also equipped with a measurement gauge 115, a controller 120, an anchor 125, a depth actuator 130, and a mount 135. The depth actuator 130 is fixedly attached to the anchor 125 whereas the mount 135 is movingly attached to the depth actuator 130. In one embodiment, the anchor 125 supports the depth actuator 130, the mount 135, and the other elements of the system 100 such that no mechanical parts or electrical equipment are below the water level 160 (except blades and possibly the power output cable 150). Alternately, at least some of the mechanical or electrical equipment are below water level 160.

The measurement gauge 115 provides measurements (such as real-time measurements) to the controller 120. Based on the measurements received from the measurement gauge 115, the controller 120 controls the depth actuator 130. The depth actuator 130 raises and lowers the turbine mount 135 depending on the signals it receives from the controller 120. In this manner, the controller 120 controls the depth of immersion Y of the blades 105. FIG. 5b depicts the system 100 when the blades are immersed at a depth of immersion Y' and a depth of immersion Y".

The measurement gauge 115 is equipped to take measurements which include but are not limited to the depth of blade immersion Y below the water surface 160, water surface chop or wave size, anchor tension, shaft position, the shaft torque T, the shaft speed ω, mechanical shaft power, one or more shaft reaction forces, the electrical power output P of the generator 110, the generator current output I, the generator voltage V, generator current or voltage frequency F, and flow velocity v. The measurement gauge 115 is equipped with a flow measurement device 140 for measuring flow velocity v. The measurements taken by the measurement gauge 115 are sent to the controller 120. These measurements can be stored as measurement statistics in the measurement gauge 115 and/or in the controller 120. It should be appreciated that the different measurements made by the measurement gauge 115 can be made by a single gauge or made separately by multiple gauges that send the measurements individually to the controller 120. For ease of illustration the measurements are depicted by a single measurement gauge 115.

In an embodiment, the turbine system 100 is also equipped with an anchor 125 for fixing the location of turbine system 100. Various anchors 125 can fix the location of the system including but not limited to a buoy, a pillar, a custom float, a barge, a tether, a pile, or a pier.

Also, various sources may be provided to supply the power required to operate the various components of the system 100 such as the controller 120, the depth actuator 130, and the measurement gauge 115. The power may be supplied from the power unit 155. In an alternative embodiment, the system 100 is equipped with one or more rechargeable batteries. These batteries are optionally recharged by the electricity produced by the generator 110, by an external power source, and/or by a solar panel. The battery can also be recharged using other means, such as by routing back grid power or a hydrocarbon-powered generator. Other auxiliary power sources include but are not limited to hydrocarbon-powered generators, fuel cells, additional land-based power supplies, or a supplemental hydraulic turbine or windmill.

In an embodiment, the controller 120 has a programmable chip and can store various protocol, which protocol include but are not limited to startup, operation, safety, shutdown, maintenance, testing, characterization, control system development, installation, communication, data collection, data logging and safe mode. The protocols can be implemented remotely or embedded into the chip. The protocol can also be changed by an engineer or operator. The controller 120 is capable of sending output signals and control signals for directing the operation of the system 100 according to the various protocol. The controller 120 can also receive input signals. Also, the controller 120 stores measurement data and command signal statistics which are a record of the different signals received and sent by the controller 120. The controller can be water-based or land based.

The generator 110 sends the electrical power through a water-resistant or water proof power output cable 150 to a power unit 155 which may be water-based or land-based depending on the needs of the end user. The power unit 155 has power electronics that condition the electrical power signal from the generator 110 so that the power generated can be utilized by an end-user load and/or a utility power grid.

An engineer or operator can also monitor and control the turbine system 100 remotely from the controller 120. For example, from the controller 120, the engineer or operator can periodically review operation and measurement statistics and then change the protocol stored in the controller 120 as needed. This can be utilized in operation sites that have little archived flow velocity data. In an embodiment, the protocol can be fine-tuned over time to achieve a desired power profile, such as to maximize energy production. The controller can also be adaptive and tune itself based on stored data such that the controller is an adaptive controller or self-tuning controller.

In an embodiment, based on the measurement statistics and the operation statistics, the engineer or operator can determine a desired output, also referred to as a predefined output. Once the predefined output has been determined, the engineer or operator programs the controller 120 with a protocol for achieving that predefined output. In one embodiment, the predefined output is determined (by an engineer, for example) during the design phase and not altered in the field. The predefined output may be mechanical power, for example.

One example of a predefined output is a constant power output. The level of the constant power output is generally determined according to the capacity of the power unit 155 and/or generator 110. As the flow velocity changes, power output can be maintained at a constant level by varying the depth immersion Y of the blades 105 below the water level 160 in a manner that achieves and maintains the desired power output level. For example, at high flow velocities, depth of immersion Y is relatively less in order to maintain constant power output and avoid excessive drag on the turbine. This operating condition has relatively higher shaft speed and lower shaft torque. As the flow velocity decreases, the consequent lower tidal power content requires the depth of immersion Y to be increased in order to maintain constant power output. The depth actuator 130 causes the blades to be lowered to achieve a swept area that maintains the desired power output level. This operating condition has relatively lower shaft speed and a relatively higher shaft torque; note that a lower tidal speed reduces the drag placed on the turbine for a given depth of immersion. In this manner drag is controlled and constant average power output is maintained.

In order to maintain constant power output, the shaft torque T and shaft speed ω are allowed to vary at different depths, such as for a fixed radius, variable depth embodiment of the system. Variable shaft torque T and variable shaft speed ω result in variable output voltage and variable output frequency from the generator 110, but a constant average power output is maintained. The power unit 155 receives this constant average power, variable voltage, and variable frequency output from the generator 110 and transforms it to a form that can be utilized by an end user and/or a utility power grid.

Figure 6A:
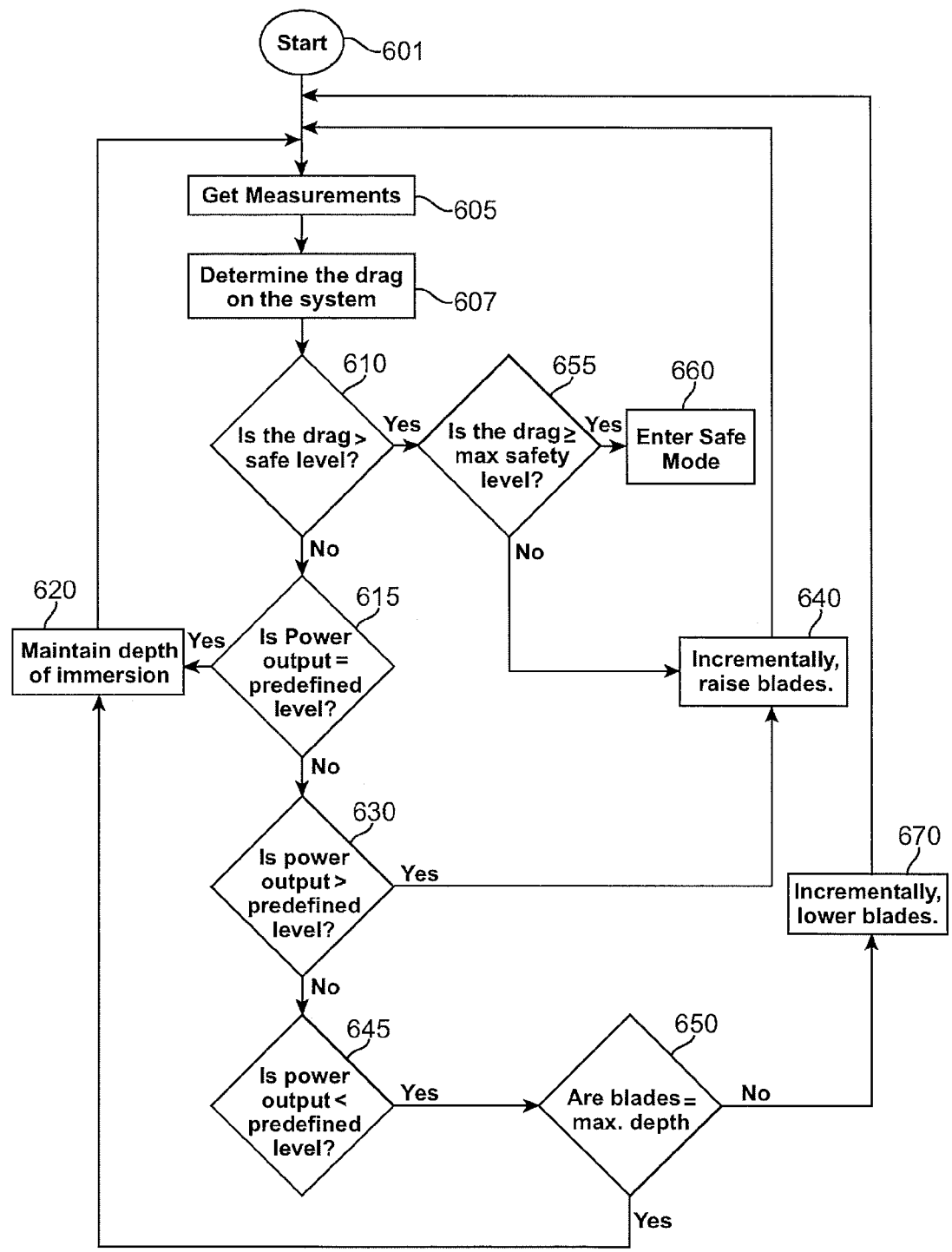
FIG. 6A is a flow chart depicting an exemplary safety protocol and output protocol when the predefined output is constant power output.

FIG. 6A is a flow chart depicting an exemplary safety protocol and output protocol when the predefined output is constant power output. The protocol represented in FIG. 6A is for purposes of example and is non-limiting. Safety protocol are first chosen to regulate the depth in order to keep the drag on the system 100 at a safe level. Second, output protocol further regulate depth in order to maintain an average power output that is set to a predefined level.

After the protocol has been initiated at step 601, the controller 120 obtains measurements 605 from the measurement gauge 115 and determines the drag on the system at step 607. If the drag is within the safe operating level (decision step 610) then it is determined whether power output is at a predefined, desired level at step 615. If so, the depth of blade immersion Y is maintained at step 620 and the protocol are run again. Without a change in flow velocity, the depth is maintained because there is no change in drag on the system 100.

If the power output is greater than the predefined level (decision step 630), the blades 105 are incrementally raised at step 640, and the protocol are run again. The blades 105 are continually raised until the power output has reached the predefined level at step 615. Thus, the immersion depth of the blades is adjusted to achieve and maintain a desired power output level.

If the power output is less than the predefined level at step 645, the blades 105 are incrementally lowered at step 670 to adjust the immersion depth of the blades, and the protocol are run again. The blades 105 are continually lowered until either the power output has reached the predefined level at step 615 or until the blades 105 are at a maximum depth (step 650) at which point the depth of immersion Y is maintained at step 620. The protocol are then run again.

If the drag exceeds a predefined safety level at step 610, then it is determined whether the drag has reached a maximum safety level (at step 655) for all depths of immersion Y. If so, then the controller 120 places the system in safe mode at step 660. If the drag is less than a maximum safety level at step 655, the blades 105 are then incrementally raised 640, and the protocol are run again. In safe mode (step 660), the controller 120 continues to monitor the flow velocity measurements from the measurement gauge 115. Once the flow velocity has fallen within a safe operating level, the blades 105 are immersed in the water and the protocol are started again at step 601. That may require a start up sequence such as to cause the turbine to spin up to a certain shaft speed using an auxiliary power source.

To resume power generation when the turbine is removed from the water and the flow speed is above the cut-out speed and slowing, a special startup algorithm may be used. One embodiment of such an algorithm would wait until the flow speed is equal to or below the cut-out speed, accelerate the turbine's shaft speed using an auxiliary power source until the shaft speed is near the typical shaft speed for power generation at flow velocity near cut-out speed, and then slowly lower the spinning turbine into the water. Once the information received from the measurement gauge 115 indicates to the controller 120 that the rotor 104 has enough momentum and lift to begin power generation, the auxiliary power source would then be shut off and power generation would commence. Other such start up sequences can be used. A bottom region of the blades can be configured for optimum startup performance in high speed flow.

Because ocean tides change gradually overtime, the protocol depicted in FIG. 6A can continually monitor the flow velocity and the drag on the system 100 and make incremental adjustments to the swept area (by varying the blade immersion depth or the diameter of the swept area) as the tide slowly changes over time.

Figure 6B:
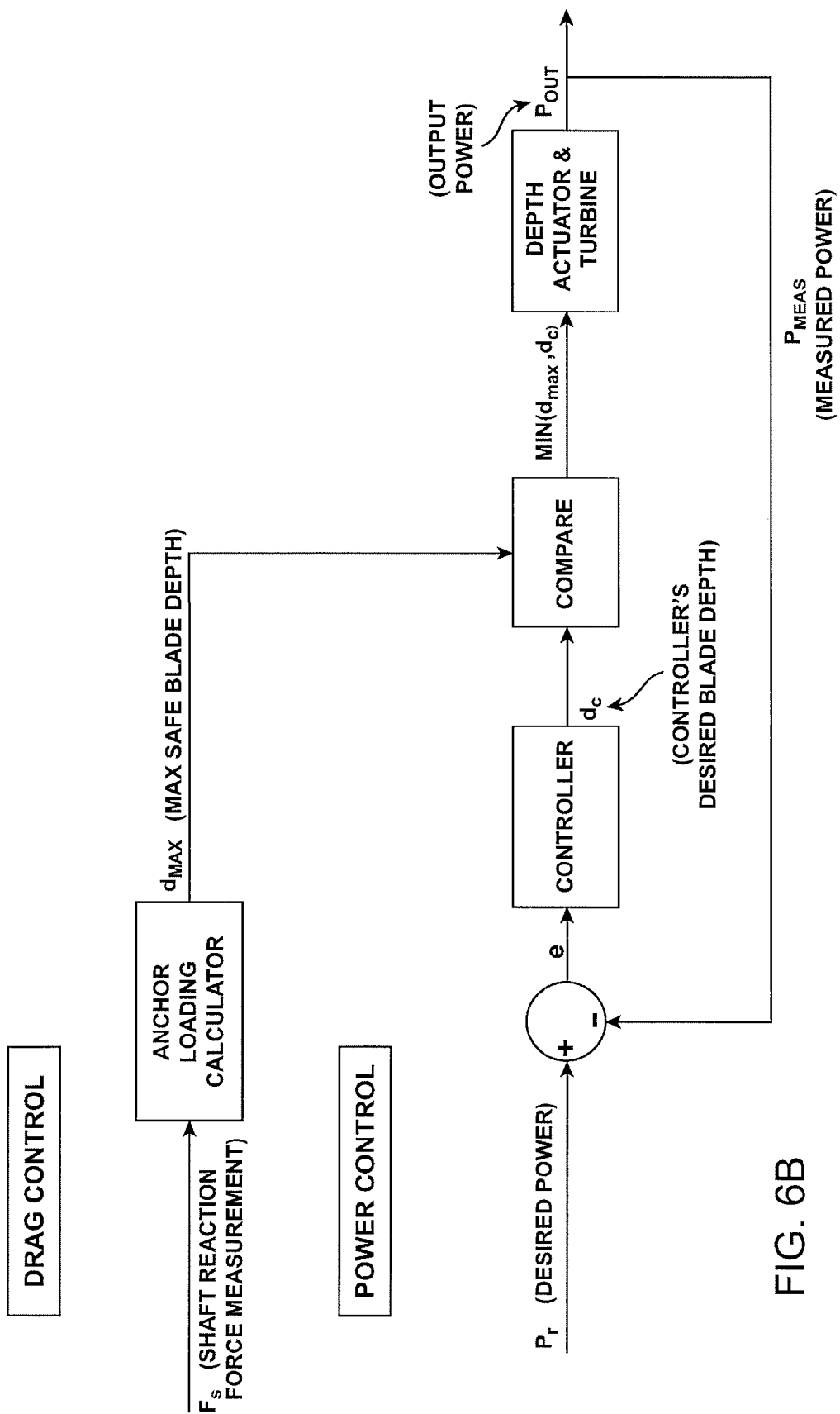
FIG. 6B shows an exemplary control system for a fail-safe embodiment.

In another embodiment, the depth actuator is "fail safe" such that if power fails then physical laws ensure that the turbine is pulled out of the water. FIG. 6B shows an exemplary control system for a fail-safe embodiment where control methods can focus on maintaining desired power output etc. The system includes a working power output controller that assumes the anchor system has been sized for worst-case drag. A fail-safe depth actuator ensures that anchor limits are not exceeded in the event of power failure. The power controller has the lead role, with maximum depth and drag checks being done in parallel as a redundant measure to make sure the anchor strength limits will not be exceeded. A control loop may be employed to check the drag on the system. This may be prudent in cases where anchor costs are high or there is significant uncertainty in how much drag will be encountered during operation with the power output controller turned on.

Figure 6C:
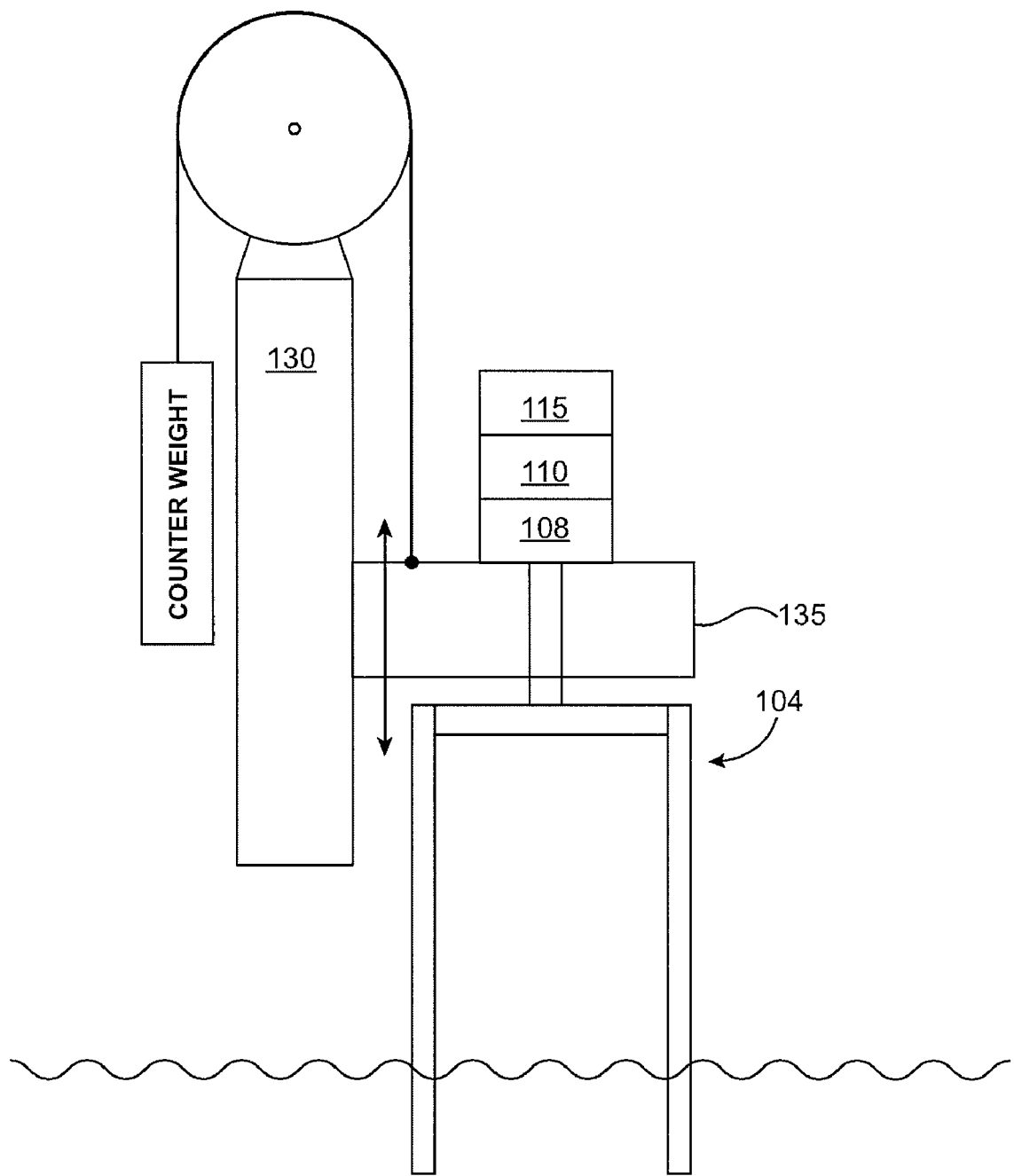
FIG. 6C shows a schematic of an exemplary fail safe turbine system.

FIG. 6C shows a schematic of a fail safe system. In the embodiment of FIG. 6C, a counter-weight system is used. A depth actuator must overcome a counterweight in order to increase the blade insertion depth. In the event of a power failure, the system lifts the blades out of the water via the counterweight. It should be appreciated that the control methods and structural embodiments described herein are exemplary and that the invention is not limited to the examples described herein.

The controller 120 can also be programmed with various start-up sequences. The start-up sequence can vary for different embodiments of the system 100. For example, in some embodiments the turbine blades 105 may not be able to self-start the turbine's rotation. For such embodiments, the system 100 can be equipped with a start-up drag device that generates sufficient drag from the water flow to initiate the turbine rotation. When the rotor 104 needs to begin spinning, the controller 120 lowers the turbine into the water so that the drag device is immersed in the flow. Once the information received from the measurement gauge 115 indicates to the controller 120 that the rotor 104 has enough momentum and lift to sustain a shaft speed w from the flow of water without the drag device immersed, the controller 120 raises the drag device out of the flow. In an embodiment, the aforementioned process is used where the tidal speed is low and is also increasing.

In one example, the start-up mechanism is a separately attached motor that drives the rotor 104. In yet another embodiment, the generator 110 is used in reverse as a motor to drive the rotor 104. Once the rotor 104 has enough momentum and lift to sustain shaft speed ω from the flow of water, the controller 120 shuts down the power being fed to the generator 110 for driving the rotor 104. The spinning rotor 104 then begins driving the generator 110. Accordingly the generator 110 begins to output power.

Figure 7:
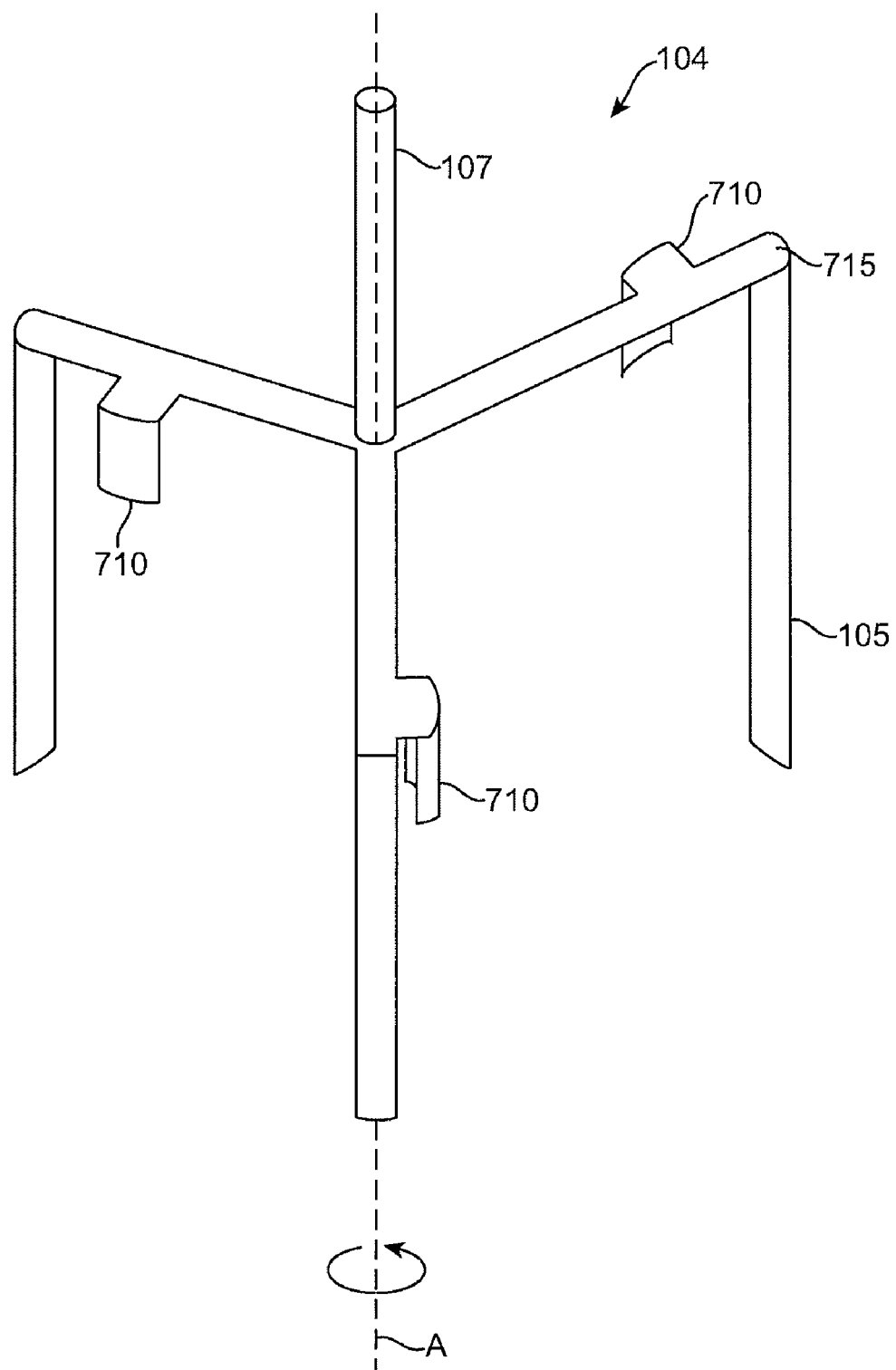
FIG. 7 depicts an exemplary drag device for the rotor

As mentioned, the rotor 104 can be equipped with a drag device 710. FIG. 7 depicts an exemplary drag device 710 for the rotor. The drag device is configured to generate drag when positioned in fluid flow wherein the drag is sufficient to impart rotational movement to the blades. It should be appreciated that the drag device can vary in shape and size and that the drag device described herein is merely exemplary. Moreover, the drag device can be attached to the rotor in various manner. In an embodiment, the drag device 710 is cup shaped and is fixedly attached to proximal end 715 of the blades 105. When the start-up sequence is initiated, the blades 105 are lowered into the water until the drag device is immersed below the water level. The flowing water with a flow velocity v engages the drag device and begins spinning the rotor 104. Once the information received from measurement gauge 115 indicates to the controller 120 that rotor 104 has enough momentum and lift from the flow of water to sustain a shaft speed ω, the controller 120 directs the depth actuator 130 to raised the blades 105 until the drag device is no longer below the water. The controller 120 then initiates the safety and operation protocol.

Figure 8:
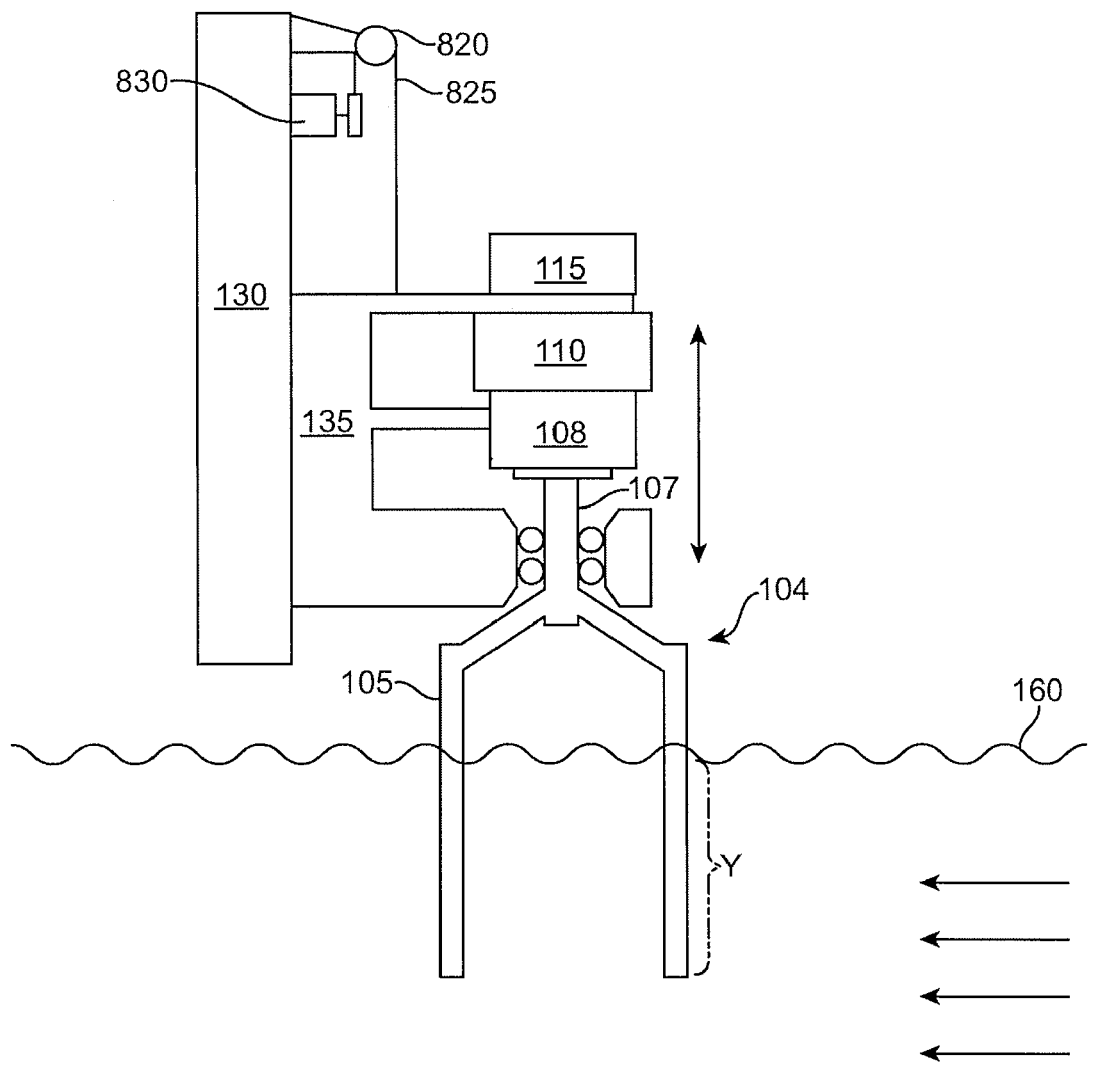
FIGS. 8 and 9 show various, non-limiting embodiments of the depth actuator.
Figure 9:
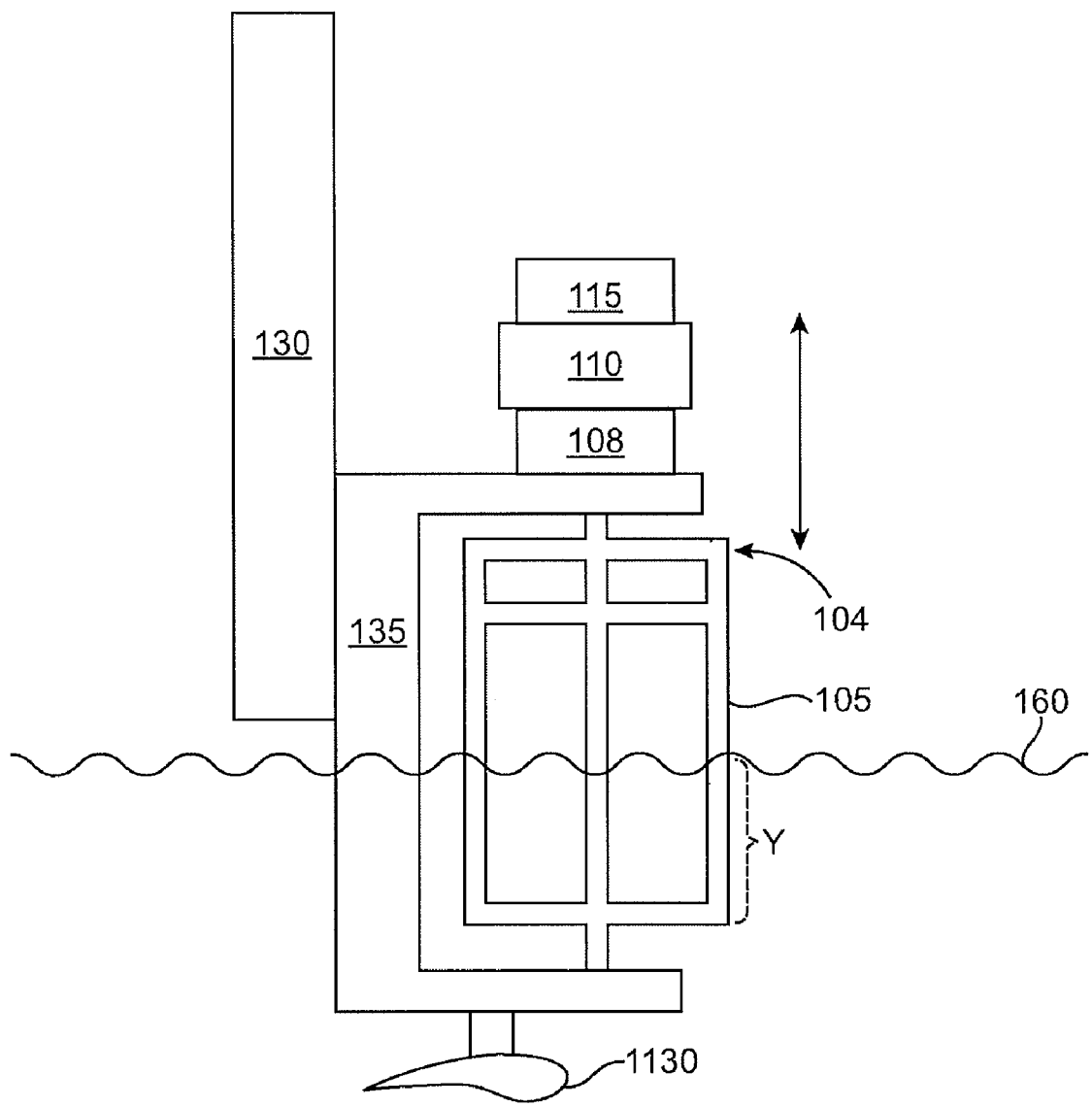

The depth actuator 130 may use various methods and devices for raising and lowering the mount 135, including but not limited to a hydraulic jack, power screw, electric rack and pinion drive, electric winch, or any other suitable lifting device. FIGS. 8 and 9 show various, non-limiting embodiments of the depth actuator 130.

FIG. 8 shows an embodiment of the depth actuator 130 which includes a pulley 820, a cable 825, and a winch 830.

The winch 830 is fixedly attached as a part of the depth actuator 130. Alternatively, the winch 830 could also be fixedly attached to the mount 135. When a signal is received from the controller 120 to lift the blades, the winch 830 retracts the cable 825. This lifts the mount 135 along bearings and/or guides contained within actuator 130. If the controller 120 signals to the depth actuator 130 to lower the blades 105, the winch then lets out the cable 825.

In FIG. 9, the mount 135 includes a hydrofoil 1130 that produces a lifting force in response to water flow. As water flows over the hydrofoil, the flowing water causes a lifting force on the hydrofoil 1130. The higher the flow velocity the greater the lifting force. Thus, the hydrofoil automatically raises the mount in response to increasing velocity of the water flow. The lifting force lifts the mount 135, which is attached to the hydrofoil 1130. At higher flow velocities, the depth of immersion Y of the blades 105 is less than at lower flow velocities.

Figure 10:
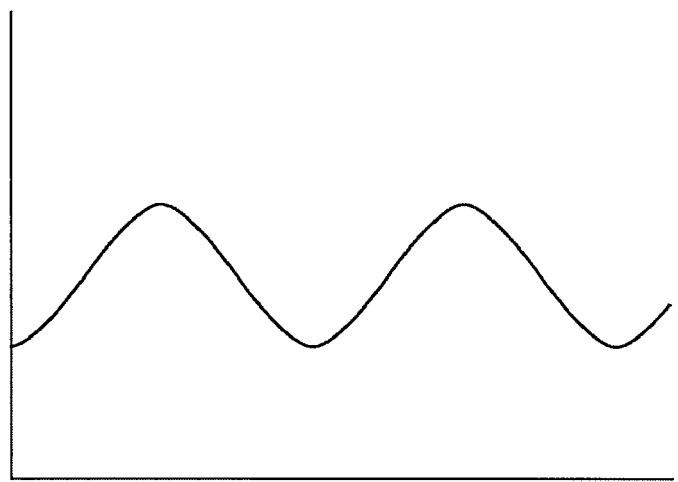
FIGS. 10 and 11 show power output wave forms.
Figure 11:
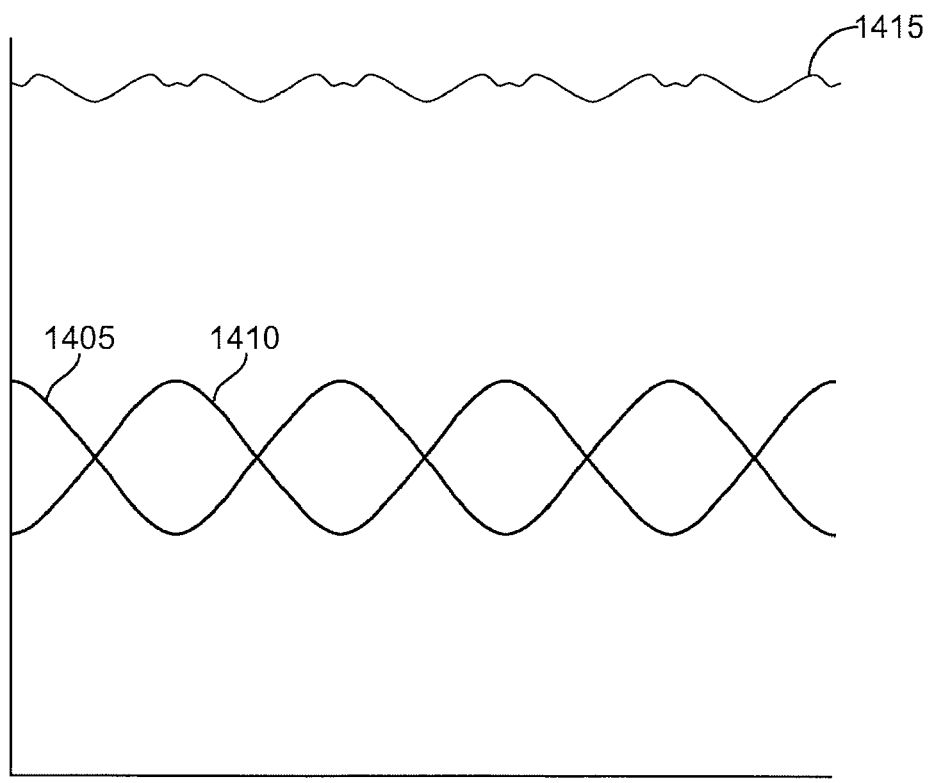

FIGS. 10 and 11 show power output wave forms. Although varying the depth of blade immersion Y can result in a constant power output over a range of varying flow speeds, the constant power output may be a constant wave form that is semi-sinusoidal such as the wave form seen in FIG. 10. This is because the torque imposed on the shaft 107 by a single blade 105 is not constant through out the rotation. One method of leveling out the semi-sinusoidal power wave is to run two rotors 104 simultaneously in the same current. The two rotors are linked mechanically or linked via the controller 120 to run a predetermined amount, such as 180 degrees out of phase with one another, as seen in FIG. 11. The power output wave 1405 from one rotor 104 would be added to the power output wave 1410 from the other rotor 104. Because the waves are out of phase with one another, adding them together would result in a near constant power signal 1415 that is easier to convert into a form that an end-user can utilize.

FIGS. 12A-12C show another embodiment wherein the rotor 104 can vary in diameter D and the depth of immersion Y can be controlled. The controller 120 controls a diameter actuator that changes the diameter D of the rotor 104. The diameter D can be varied by moving the blades away from or toward the axis of rotation A. The controller 120 also controls the depth actuator 130 that controls the depth of immersion Y of the blades 105. In this manner the system 100 can control both the diameter D of the rotor 104 and the depth of immersion Y. The measurement gauge 115 in addition to measuring the depth of immersion Y, also measures the diameter D of the rotor 104. These measurements are sent to the controller 120.

Figure 13:
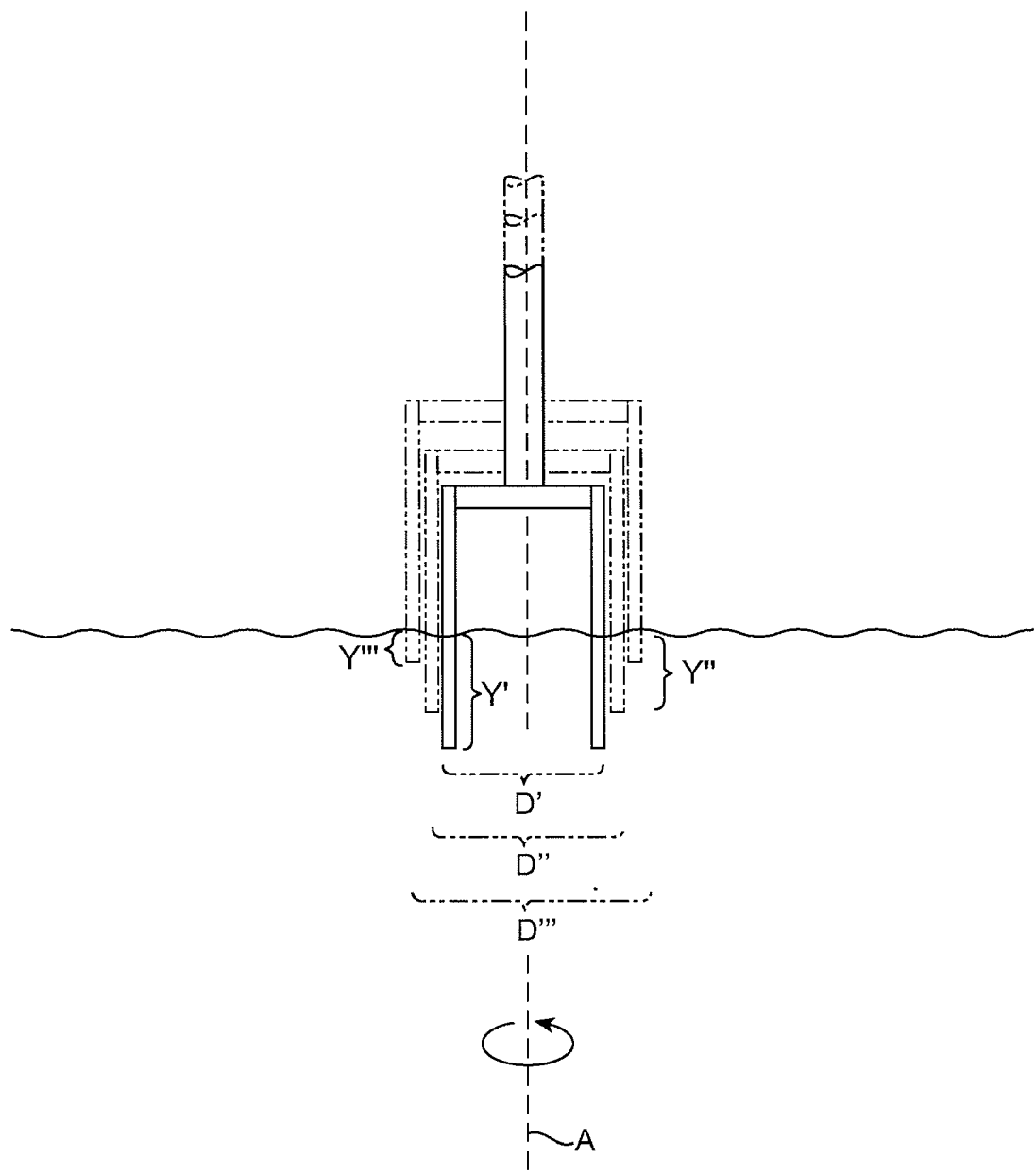
FIG. 13 shows a schematic view of a rotor that has variable diameter and depth.

By varying the diameter D and the depth of immersion Y, the controller 120 can be programmed with various protocol for controlling multiple variables. For example, for variable flow velocities, and within a limited flow velocity range near an optimum operating point, the controller 120 can be programmed with a protocol for maintaining constant average power output as well as constant average shaft torque and constant average shaft velocity. For each flow velocity v, a diameter D and a depth Y are determined at which the system 100 has constant average power output, constant average shaft torque, and constant average shaft speed. As seen in the schematic view of FIG. 13, at flow velocity v' there is a depth Y' and diameter D' that outputs the same average mechanical power, average shaft torque, and average shaft speed as at a higher flow velocity v'', depth Y'', and diameter D''. At an even higher flow velocity v''', there is another depth Y''' and diameter D''' for maintaining constant average mechanical power output, average shaft torque, and average shaft speed. In other words, if the flow velocity v increases, the diameter D is increased and depth Y is decreased to maintain constant average mechanical power output, average shaft torque, and average shaft speed. Thus, as flow velocity increases the turbine is pulled out of the water and the diameter increased in order to maintain constant average mechanical power output. Depending on the desired output, the controller 120 may be programmed with various protocol for producing various predefined output.

Figure 14:
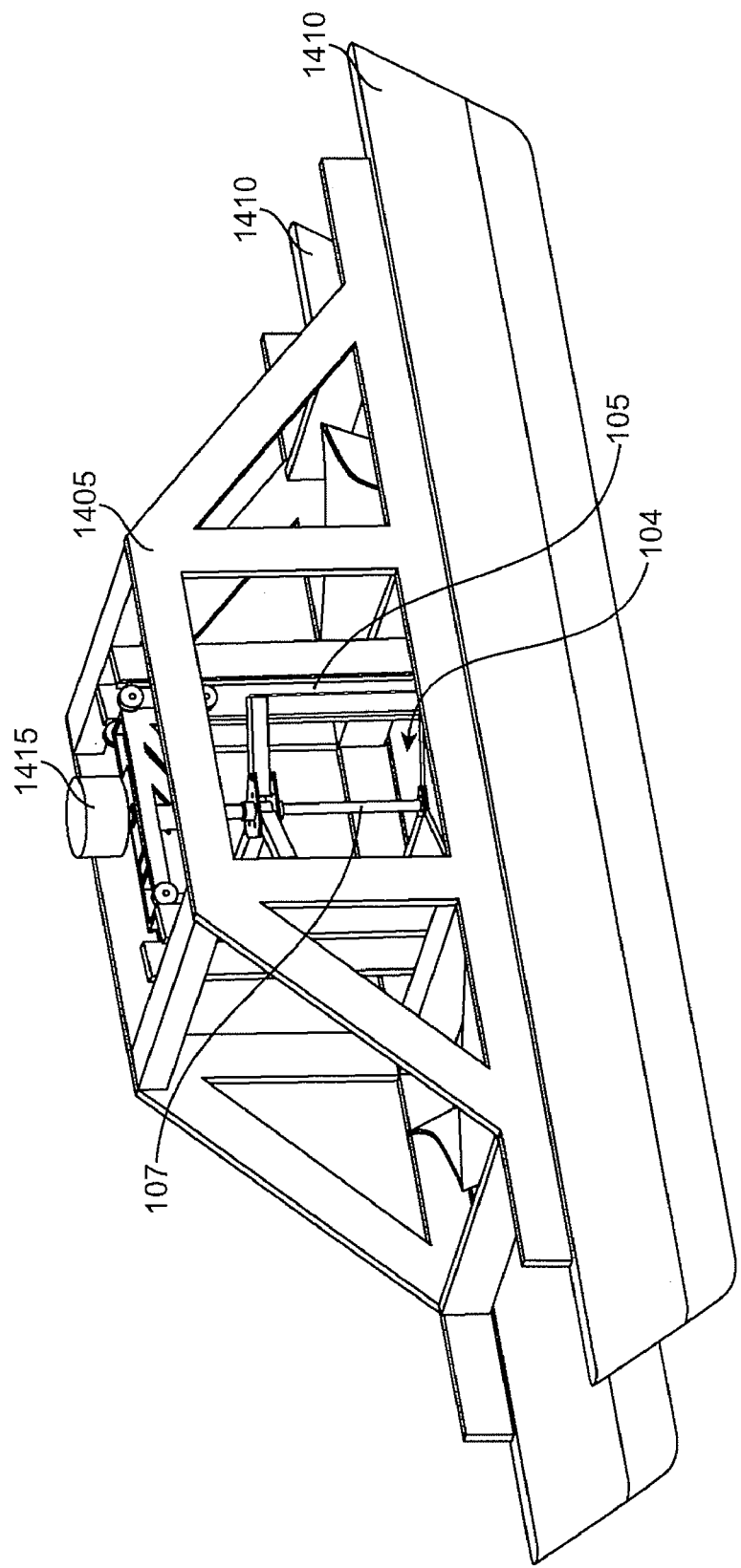
FIG. 14 shows a perspective view of an embodiment of a power extraction device that includes a turbine.

FIG. 14 shows a perspective view of an embodiment of a power extraction device that includes a turbine. The turbine is adapted to vary a swept area with respect to a body of water by moving up and down within the body of water. The device includes rotor 104, which includes a rotatable shaft 107 that is coupled to two or more blades 105. The rotor 104 is movably mounted to a frame 1405 comprised of an interconnected assembly of trusses. The frame 1405 is mounted on floating members, such as pontoons 1410, that are configured to float on the body of water. It should be appreciated that the embodiment shown in FIG. 14 is exemplary and that the structural configuration of the power extraction device can vary.

The rotor 104 is configured to move upward and downwardly along a vertical axis or along an axis that has a vertical component. In the illustrated embodiment, the rotor 104 is movably coupled to a system of vertically-extending rails, such as via a wheel engagement with the rails. Other mechanisms for moving the rotor upward and downward can be used. A generator 1415 converts the mechanical power output of the rotor into electricity.

The pontoons 1410 are configured to float on the body of water and thereby support the rotor on the water. The pontoons are adapted to perform in a predetermined manner with respect to surface conditions of the water, such as to minimize the effects of surface chop on the device. For example, the pontoons may have a length that is larger than a predetermined integral quantity of typical surface chop wavelengths of the water. In an exemplary embodiment, if the device is intended to operate in up to 2-foot surface chop, the length of the pontoons is prescribed to be at least 4 times greater than the average wavelength of the 2-foot chop for the area of deployment, on the order of 30 feet long. In another non-limiting embodiment, the width of the pontoon cross section is chosen to be as narrow as pragmatically possible so as to minimize the buoyancy force imparted on the craft by any single surface chop peak. The control system of the device can be configured to monitor the size of waves adjacent the device, such as to monitor the height of the waves. If the wave height reaches a predetermined threshold value, the system can withdraw the turbine from the water.

The pontoons or any other portion of the structure can be equipped with means to counteract torque that is generated from rotation of the vanes. For example, one or more fins can be positioned on the pontoons to counteract such torque.

Figure 15:
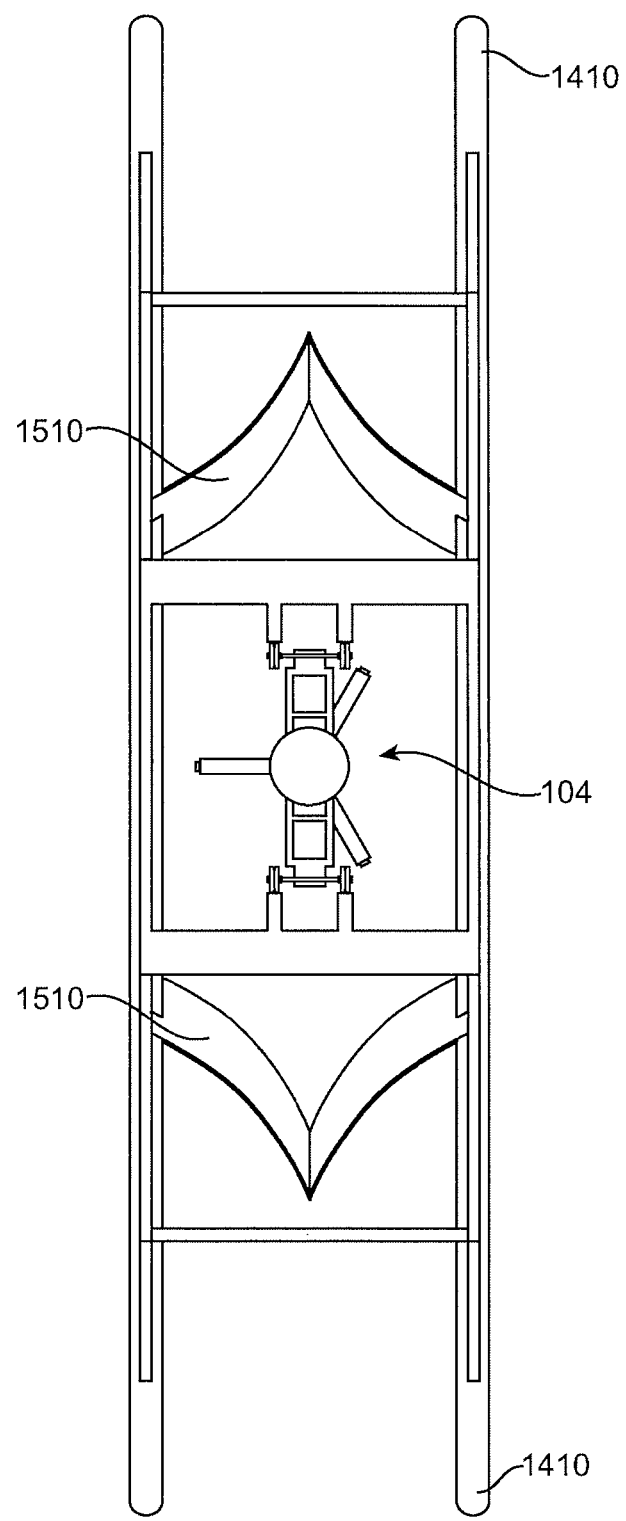
FIG. 15 shows a top view of the device of FIG. 14.

In an embodiment, the pontoons 1410 can be positioned relative to the rotor 104 such that they guide or divert water flow relative to the rotor 104. FIG. 15 shows a top view of the device. The pontoons 1410 are positioned on either side of the rotor 104. In an embodiment, the pontoons are configured to act as a guideway for guiding water flow to the rotor. The device can be equipped with additional water guideway features that serve to guide or otherwise regulate water flow to the rotor. For example, a set of baffles 1510 can be coupled to the pontoons 1410. The baffles 1510 act as breakwater members that divert, guide, displace or otherwise regulate water flow to the rotor. The baffles can also reduce the chop height of waves prior to the waves reaching the rotor. The baffles 1510 can be adapted to move vertically so as to tune the amount of chop height reduction and/or reduce drag and wave impact, such as during a storm.

Figure 16:
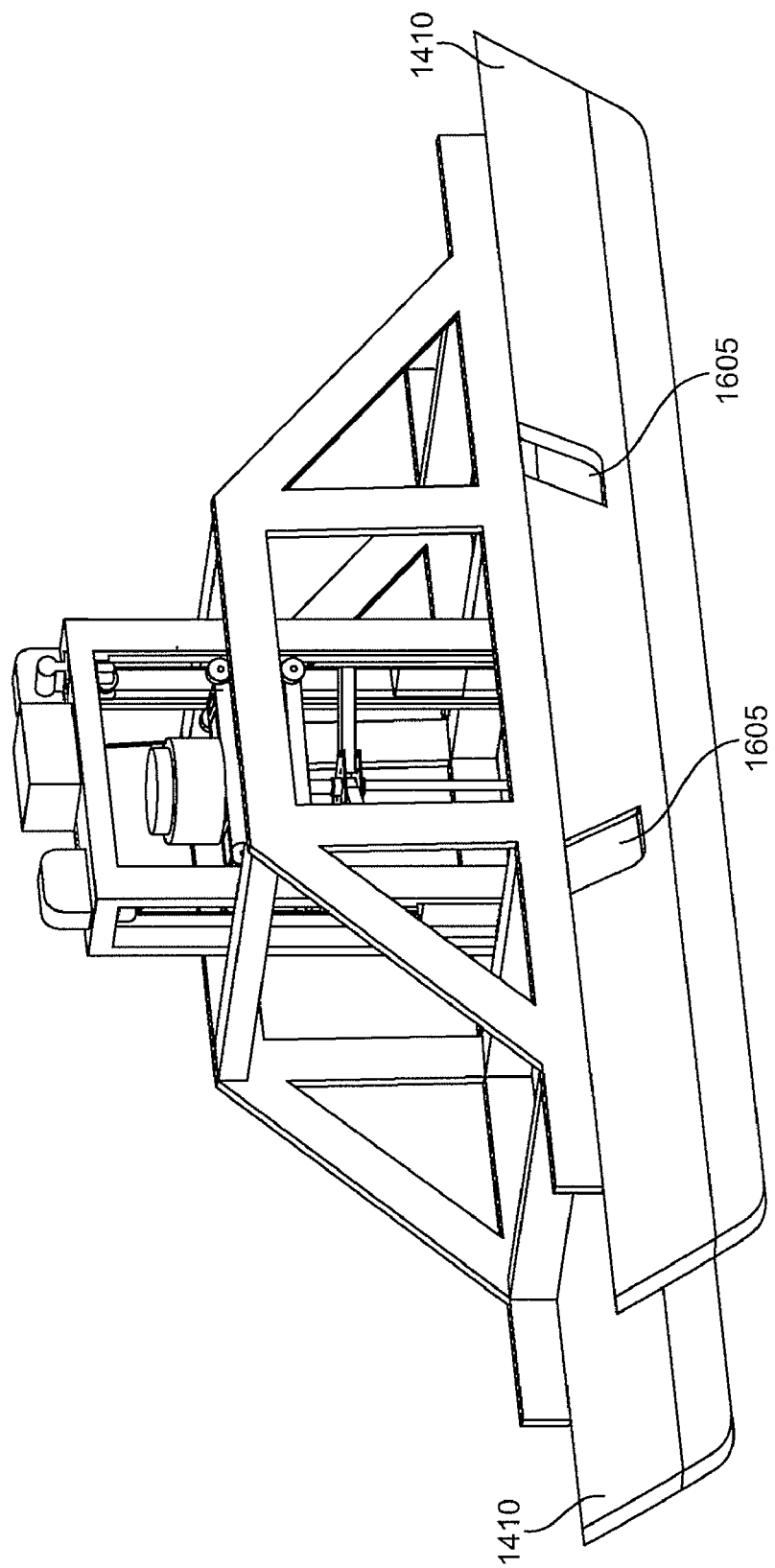
FIG. 16 shows a perspective view of another embodiment of a power extraction device.

FIG. 16 shows another embodiment of a power extraction device that is similar to the device shown in FIG. 14. This embodiment includes a counterweight mechanism for moving the rotor along the vertical axis. In addition, the pontoons 1410 are equipped with one or more guide openings 1605 that communicate with the baffles 1510. The guide openings 1605 can guide water in a predetermined manner relative to the baffles or can serve as an outlet for water diverted by the baffles to escape without creating excessive drag on the support structure. For example, the openings can be sized and positioned such that the openings provide an escape pathway for water to flow out of the space between the pontoons. In one embodiment, the pontoons and the baffles are positioned relative to the water line such that the baffles divert surface chop away from the turbine in order to minimize or eliminate surface chop effect on the turbine. In this manner, the turbine is exposed to water flow that is relatively unaffected by surface chop.

A number of embodiments of the invention have been described. Nevertheless, it will be understood that various modifications may be made without departing from the spirit and scope of the disclosure. Accordingly, other embodiments are within the scope of the following claims.

What is claimed is:

1. A method of extracting energy from a body of liquid, comprising:
   providing a turbine having at least one substantially vertical vane that can move in response to flow of the liquid, the vane having a vertical height and is fixedly positioned in parallel to a vertical axis of rotation;
   submerging at least a portion of the vane below a surface of the liquid to cause the vane to move in response to flow of the liquid;
   moving the vane along said vertical axis to vary a swept working area of the vane with respect to the liquid so as to regulate a predefined output of the turbine.

2. A method as in claim 1, wherein at least one vane has a shape that varies as a function of position along its vertical axis.

3. A method as in claim 1, wherein there are at least two vanes and the vanes are positioned relative to one another such that that the swept working area varies as the vanes are moved along the vertical axis.

4. A method as in claim 1, further comprising:
   submerging only a bottom region of the vane below the surface of the liquid until a predetermined condition is satisfied, wherein the bottom region of the vane is configured for a predetermined liquid flow condition; and
   submerging an additional region of the vane below the surface upon satisfaction of the predetermined condition.

5. A method as in claim 4, wherein the predetermined condition is at least one of the following conditions:
   (a) the liquid is moving at a flow speed that is above a cut-out speed of the turbine and the flow speed is also decreasing;
   (b) the liquid is moving at a flow speed that is equal or less than the cut-out speed.

6. A method as in claim 1, further comprising causing the vane to spin using an external power source prior to submerging the vane.

7. A method as in claim 1, further comprising:
   completely removing the vane from below the surface of the liquid in response to a predetermined flow condition of the liquid.

8. A method as in claim 7, wherein the predetermined flow condition comprises at least one of the following:
   (a) the liquid is moving at a flow speed that is above a cut-out speed of the turbine;
   (b) the liquid exhibits a surface chop that is above a maximum value;
   (c) the turbine is in a malfunctioned state.

9. A method as in claim 1, further comprising:
   coupling the turbine to a structure that buoys at least a portion of the turbine on the body of liquid.

10. A method as in claim 1, further comprising using a counterweight to move the vane.

11. A method as in claim 1, further comprising coupling a power source to the turbine to power the system.

12. A method as in claim 1, wherein movement of the vane is accomplished using at least one of an electric motor, a pneumatic actuator, and a hydraulic actuator.

13. A method as in claim 1, wherein movement of the vane is accomplished using a pressure differential in the vicinity of the vanes.

14. A method as in claim 1, further comprising coupling a control system to the turbine.

15. A method as in claim 14, wherein the control system regulates a drag level of the turbine.

16. A method as in claim 14, wherein the controller is adaptive and can self-tune in response to flow conditions of the body of liquid.

17. A method as in claim 1, further comprising submerging a drag device below the surface to assist in initial rotation of the vane in response to flow of the liquid.

18. A method as in claim 1, further comprising considering the turbines cut-out speed prior to submerging the vane.

19. A method as in claim 1, further comprising providing at least a second turbine.

20. A method as in claim 19, further comprising use of a phase shift of the turbines.

21. A method as in claim 19, wherein the turbines counter-rotate with respect to one another.

22. A method as in claim 1, wherein the liquid is water.

23. A method as in claim 1, wherein the vane moves along a completely vertical axis.

24. A method as in claim 1, wherein at least one vane is oriented such that a diameter of the vane varies moving along the height of the vanes.

25. A method as in claim 1, wherein at least one vane is shaped such that a diameter of the vane varies as a function of the height of the vanes.

26. A method as in claim 1, further comprising withdrawing the vane from the liquid if waves on the liquid exceed a maximum height.

* * * * *